United States Patent
Georgitsis et al.

(10) Patent No.: US 8,277,077 B2
(45) Date of Patent: *Oct. 2, 2012

(54) AUXILIARY LIGHTING SYSTEMS

(76) Inventors: Antony C. Georgitsis, Algona, WA (US); Nicholas B. Irwin, Algona, WA (US); Joseph Biro, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/091,326

(22) Filed: Apr. 21, 2011

(65) Prior Publication Data

US 2011/0194287 A1  Aug. 11, 2011

Related U.S. Application Data

(63) Continuation of application No. 12/247,145, filed on Oct. 7, 2008, now Pat. No. 7,950,821.

(60) Provisional application No. 60/983,120, filed on Oct. 26, 2007, provisional application No. 61/060,767, filed on Jun. 11, 2008.

(51) Int. Cl.
  *F21V 21/30* (2006.01)
  *F21V 29/00* (2006.01)
  *F21V 17/02* (2006.01)

(52) U.S. Cl. .................... 362/217.12; 362/218; 362/220; 362/232; 362/269; 362/371; 362/373; 362/427; 362/430

(58) Field of Classification Search .................. 362/232, 362/245, 327, 217.12, 217.16, 218, 220, 362/269, 287, 294, 370, 371, 373, 427, 428, 362/430

See application file for complete search history.

(56) References Cited

U.S. PATENT DOCUMENTS

| | | | |
|---|---|---|---|
| 826,205 A | 7/1906 | Whitehouse | |
| 2,422,280 A * | 6/1947 | Abernathy | 315/99 |
| 4,101,957 A | 7/1978 | Chang | |
| 4,151,584 A | 4/1979 | Labrum | |
| 4,392,187 A | 7/1983 | Bornhorst | |
| 4,463,413 A * | 7/1984 | Shirley | 362/401 |
| 4,500,947 A | 2/1985 | Perkins | |
| 4,530,040 A | 7/1985 | Petterson | |
| 4,583,153 A | 4/1986 | Tsuyama | |
| 4,698,730 A | 10/1987 | Sakai et al. | |
| 4,745,531 A | 5/1988 | Leclercq | |
| 4,803,605 A | 2/1989 | Schaller et al. | |
| 4,814,950 A | 3/1989 | Nakata | |
| 4,941,070 A | 7/1990 | Ogawa et al. | |
| 4,959,757 A | 9/1990 | Nakata | |
| 4,962,450 A | 10/1990 | Reshetin | |
| 5,057,978 A | 10/1991 | Conti | |
| 5,060,120 A | 10/1991 | Kobayashi et al. | |
| 5,072,346 A | 12/1991 | Harding | |
| 5,103,381 A | 4/1992 | Uke | |
| 5,249,109 A | 9/1993 | Denison et al. | |
| 5,268,977 A | 12/1993 | Miller | |
| 5,282,121 A | 1/1994 | Bornhorst et al. | |
| 5,526,248 A | 6/1996 | Endo | |
| 5,577,493 A | 11/1996 | Parkyn, Jr. et al. | |
| 5,607,225 A * | 3/1997 | Halvatzis | 362/125 |
| 5,613,765 A * | 3/1997 | Gill | 362/269 |
| 5,630,661 A | 5/1997 | Fox | |
| 5,673,990 A | 10/1997 | Neumann et al. | |
| 5,711,590 A | 1/1998 | Gotoh et al. | |
| 5,808,775 A | 9/1998 | Inagaki et al. | |

(Continued)

*Primary Examiner* — Alan Cariaso
(74) *Attorney, Agent, or Firm* — Barnes & Thornburg LLP; Mark J. Nahnsen

(57) ABSTRACT

Vehicle-mounted auxiliary lighting systems adapted to provide primary or auxiliary vehicle lighting using light emitting diodes (LEDS) are disclosed.

29 Claims, 17 Drawing Sheets

U.S. PATENT DOCUMENTS

| | | | |
|---|---|---|---|
| 5,897,196 | A | 4/1999 | Soskind et al. |
| 5,899,559 | A | 5/1999 | Lachmayer et al. |
| 5,904,417 | A | 5/1999 | Hewett |
| 5,934,795 | A | 8/1999 | Rykowski et al. |
| 5,954,428 | A | 9/1999 | Eichhorn et al. |
| 5,986,779 | A | 11/1999 | Tanaka et al. |
| 6,007,210 | A | 12/1999 | Yamamoto et al. |
| 6,123,440 | A | 9/2000 | Albou |
| 6,220,736 | B1 | 4/2001 | Dobler et al. |
| 6,227,681 | B1 * | 5/2001 | Shoemaker et al. .......... 362/269 |
| 6,227,685 | B1 | 5/2001 | McDermott |
| 6,252,338 | B1 | 6/2001 | Bergman et al. |
| 6,280,071 | B1 | 8/2001 | Yamamoto et al. |
| 6,354,721 | B1 | 3/2002 | Zattoni |
| 6,406,171 | B1 | 6/2002 | Satsukawa et al. |
| 6,536,899 | B1 | 3/2003 | Fiala |
| 6,547,423 | B2 | 4/2003 | Marshall et al. |
| 6,575,609 | B2 | 6/2003 | Taniuchi et al. |
| 6,575,610 | B2 | 6/2003 | Natsume |
| 6,603,243 | B2 | 8/2003 | Parkyn et al. |
| 6,741,406 | B2 | 5/2004 | Kitamura et al. |
| 6,796,690 | B2 | 9/2004 | Bohlander |
| 6,827,467 | B2 | 12/2004 | Tenmyo |
| 6,866,401 | B2 | 3/2005 | Sommers et al. |
| 6,932,490 | B2 | 8/2005 | Emil et al. |
| 6,986,593 | B2 | 1/2006 | Rhoads et al. |
| 7,114,832 | B2 | 10/2006 | Holder et al. |
| 7,226,185 | B2 | 6/2007 | Dolgin et al. |
| 7,281,820 | B2 | 10/2007 | Bayat et al. |
| 7,775,679 | B2 | 8/2010 | Thrailkill et al. |
| 2002/0145884 | A1 | 10/2002 | Yamamoto |
| 2003/0007359 | A1 | 1/2003 | Sugawara et al. |
| 2003/0090906 | A1 | 5/2003 | Hayakawa |
| 2004/0017685 | A1 | 1/2004 | Dedoro |
| 2010/0014286 | A1 | 1/2010 | Yoneda et al. |

* cited by examiner

AUXILIARY LIGHTING SYSTEMS

CROSS-REFERENCE TO RELATED APPLICATION

The present application a Continuation of application Ser. No. 12/247,145, filed Oct. 7, 2008, now U.S. Pat. No. 7,950, 821, which claims priority under 35 U.S.C. §119(e) to U.S. Provisional Patent Application No. 60/983,120, filed Oct. 26, 2007, entitled "AUXILIARY LIGHTING SYSTEMS", and which claims priority under 35 U.S.C. §119(e) to U.S. Provisional Patent Application No. 61/060,767, filed Jun. 11, 2008, entitled "AUXILIARY LIGHTING SYSTEMS", the contents of which applications are incorporated herein by reference in their entireties and are not admitted to be prior art with respect to the present invention by the mention in this cross-reference section.

BACKGROUND

This invention relates to providing auxiliary lighting systems. More particularly, this invention relates to vehicle-mounted auxiliary lighting systems adapted to provide primary or auxiliary vehicle lighting.

Effective external lighting is important to the safe operation of vehicles in low light environments. In general, effective external vehicle lighting systems should exhibit a maximum output of useful illumination at a level of current draw within the capacity of the vehicle's electrical system, a physical size appropriate to the physical structures of the vehicle, and in-service durability consistent with the operational dynamics of the vehicle to which the system is equipped. In addition, such systems should operate consistently and on-demand with minimal care maintenance. Improving the effectiveness of such external vehicle lighting systems would be of great benefit not only within the fields of vehicular design and production, but also within fields dependent on safe and efficient vehicle operation.

OBJECTS AND FEATURES OF THE INVENTION

A primary object and feature of the present invention is to provide a system addressing the above-mentioned issues.

It is a further object and feature of the present invention to provide such a system generating relatively high levels of usable illumination at a relatively low amperage draw. It is another object and feature of the present invention to provide such a system having a high degree of in-service durability, even within applications developing high dynamic forces. It is a further object and feature of the present invention to provide such a system comprising a relatively compact and weather-resistant housing. It is another object and feature of the present invention to provide such a system having such a compact housing that may be supplied in essentially any modular length.

It is another object and feature of the present invention to provide such a system utilizing an array of light-emitting diodes (LEDs). It is a further object and feature of the present invention to provide such a system comprising an efficient heat-rejecting arrangement adapted to reject heat developed by the light-emitting diodes during operation.

It is a further object and feature of the present invention to provide such a system comprising a mounting assembly that is both readily adjustable and highly stable during use. A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a lighting system comprising: at least one linear light module structured and arranged to produce light; at least one linear housing, comprising at least one housing length, structured and arranged to house such at least one linear light module; at least one mounting assembly structured and arranged to assist mounting of such at least one linear housing to at least one mountable surface; wherein such at least one mounting assembly comprises at least one elongated support bar structured and arranged to support such at least one linear housing substantially continuously along such at least one housing length, wherein such at least one elongated support bar comprises at least one longitudinal axis and at least one bar length, moveably coupled with such at least one elongated support bar, at least one attacher structured and arranged to assist fixed attachment of such at least one elongated support bar to the at least one mountable surface, wherein such at least one attacher comprises at least one axial translator structured and arranged to assist axial translation of such at least one attacher along at least one translational axis oriented substantially parallel to such at least one longitudinal axis of such at least one elongated support bar; wherein such at least one linear housing comprises at least one internal bar-receiving channel structured and arranged to receive therein substantially an entire such bar length of such at least one elongated support bar; and wherein such at least one linear housing is structured and arranged to be rotatable about such at least one longitudinal axis when engaged within such at least one internal bar-receiving channel.

Moreover, it provides such a lighting system wherein such at least one linear housing comprises: at least one extruded member having open ends and at least one internal hollow cavity structured and arranged to house such at least one linear light module; at least one end cap structured and arranged to cap such open ends; at least one front protective cover structured and arranged to protectively cover at least one front portion of such at least one internal hollow cavity; wherein such at least one front protective cover comprises at least one substantially transparent composition structured and arranged transparently pass the light produced by such at least one linear light module therethrough. Additionally, it provides such a lighting system further comprising at least one environmental infiltrate blocker structured and arranged to block the passage of environmental infiltrates into such at least one internal hollow cavity through mated engagements of such at least one extruded member.

Also, it provides such a lighting system further comprising: situate between each such at least one end cap and each such at least one open end, at least one end seal structured and arranged to seal such at least one end cap to a respective such at least one open end; and situate between such at least one front protective cover, such at least one end cap, and such at least one extruded member, at least one front seal structured and arranged to seal such at least one front protective cover to such at least one end cap and such at least one extruded member; wherein such at least one end seal and such at least one front seal assist in blocking the intrusion of environmental infiltrates to within such at least one internal hollow cavity. In addition, it provides such a lighting system wherein such at least one linear light module comprises: at least one electrically-driven light emitting diode structured and arranged to generate light; at least one focusing lens structured and arranged to focus the generated light into at least one beam pattern; and at least one lens positioner structured and arranged to position such at least one focusing lens relative to such at least one light source; wherein such at least one focusing lens produces such at least one beam pattern by total internal reflection.

And, it provides such a lighting system wherein such at least one focusing lens produces such at least one beam pattern by total internal reflection and refraction. Further, it provides such a lighting system further comprising at least one unifying frame structured and arranged to unify at least four of such at least one focusing lens into a single modular lens element. Even further, it provides such a lighting system wherein such at least one linear light module further comprises: at least one heat-dissipation assembly structured and arranged to dissipate heat generated by such at least one electrically-driven light emitting diode during production of the light; wherein such at least one heat-dissipation assembly comprises at least one circuit board structured and arranged to provide circuit-board support of such at least one electrically-driven light emitting diode, at least one thermally-conductive plate structured and arranged to absorb and dissipate the heat, and at least one positioner structured and arranged to position such at least one circuit board adjacent such at least one thermally-conductive plate; wherein such at least one circuit board comprises at least one aperture structured and arranged to pass at least one portion of such at least one electrically-driven light emitting diode therethrough; wherein such at least one electrically-driven light emitting diode is mounted to such at least one circuit board such that such at least one portion of such at least one electrically-driven light emitting diode passes through such at least one aperture passage to comprise a position of thermal contact with such at least one thermally-conductive plate.

Moreover, it provides such a lighting system wherein: such at least one thermally-conductive plate comprises at least one heat-absorption surface and at least one heat-dissipating surface; such at least one electrically-driven light emitting diode comprises at least one position of thermal contact with such at least one heat-absorption surface; and such at least one heat-dissipating surface comprises at least one position of thermal contact with such at least one extruded member; whereby the heat generated by such at least one electrically-driven light emitting diode during production of the light is dissipated by a transfer of heat energy to such at least one extruded member. Additionally, it provides such a lighting system wherein such at least one extruded member comprises: at least one external heat-rejection region structured and arranged to assist rejection of the heat from such at least one extruded member to a surrounding environment; wherein such at least one external heat-rejection region comprises a plurality of fins structured and arranged to provide increased surface area in thermal communication with the surrounding environment.

Also, it provides such a lighting system wherein such at least one mounting assembly further comprises: at least one first positional retainer structured and arranged to positionally retain such at least one linear housing in at least one fixed rotational position relative to such at least one elongated support bar; wherein such at least one first positional retainer comprises at least one adjustable biaser structured and arranged to adjustably bias at least one outer surface of such at least one elongated support bar toward at least one position of contact with at least one inner surface of such at least one internal bar-receiving channel; wherein such at least one first positional retainer assists in maintaining such at least one fixed rotational position substantially by at least one frictional interaction between such at least one outer surface of such at least one elongated support bar and such at least one inner surface of such at least one internal bar-receiving channel.

In addition, it provides such a lighting system wherein such at least one adjustable biaser comprises: at least one threaded tensioner structured and arranged to tension such at least one attacher to at least one position of contact with such at least one linear housing and such at least one outer surface of such at least one elongated support bar to the at least one position of contact with such at least one inner surface of such at least one internal bar-receiving channel; wherein such at least one elongated support bar comprises at least one elongated slot structured and arranged to allow translational movement of such at least one threaded tensioner substantially parallel with such at least one longitudinal axis; and wherein such at least one threaded tensioner is structured and arranged to pass through such at least one elongated slot during such coupling of such at least one attacher with such at least one elongated support bar.

In addition, it provides such a lighting system wherein such at least one mounting assembly further comprises: at least one second positional retainer structured and arranged to retain such at least one linear housing in at least one fixed rotational position relative to such at least one elongated support bar; wherein such at least one second positional retainer comprises at least one threaded end lock structured and arranged to positionally lock such at least one end cap in at least one fixed rotational position relative to such at least one elongated support bar. Further, it provides such a lighting system wherein such at least one end lock comprises at least one threaded coupler structured and arranged to frictionally couple such at least one end cap to such at least one elongated support bar. Even further, it provides such a lighting system further comprising at least one conformer structured and arranged to conform such at least one attacher to at least one geometric profile of the at least one mountable surface.

Moreover, it provides such a lighting system wherein such at least one conformer is structured and arranged to be attachable to at least one generally radiused profile of the at least one mountable surface. Additionally, it provides such a lighting system wherein such at least one conformer is structured and arranged to be attachable to a generally planar of the at least one mountable surface. Also, it provides such a lighting system wherein such at least one conformer comprises at least one dampener structured and arranged to dampen transmission of mechanical forces through such at least one attacher. In addition, it provides such a lighting system wherein each such at least one attacher is independently adjustable along the at least one longitudinal axis of such at least one elongated support bar.

In accordance with another preferred embodiment hereof, this invention provides a lighting system comprising: a plurality of discrete light sources each one structured and arranged to generate light; a plurality of focusing lenses, each one structured and arranged to focus the light generated by each discrete light source into at least one beam pattern; at least one lens positioner structured and arranged to position such plurality of focusing lenses relative to such plurality of discrete light sources; wherein each discrete light source of such plurality of discrete light sources comprises a light-emitting diode; and wherein such each focusing lens of such plurality of focusing lenses produces such at least one beam pattern substantially by total internal reflection. And, it provides such a lighting system wherein such at least one lens positioner comprises: at least one beam-pattern adjuster structured and arranged to assist user-selectable adjustment to such at least one beam pattern; wherein such user-selectable adjustment is achieved by at least one positional adjustment of such plurality of focusing lenses relative to such plurality of discrete light sources.

In accordance with another preferred embodiment hereof, this invention provides a lighting system comprising: at least one light source structured and arranged to generate light; at least one focusing lens structured and arranged to focus the generated light into at least one beam pattern; at least one beam-pattern adjuster structured and arranged to assist user selectable adjustment to such at least one beam pattern; wherein such user selectable adjustment to such at least one beam pattern is achieved by at least one positional adjustment of such at least one focusing lens relative to such at least one light source; wherein such at least one beam adjuster is structured and arranged to adjust such at least one beam between at least one flood pattern and at least one focused beam pattern; wherein such at least one focusing lens produces at least one light beam substantially by total internal reflection. In addition, it provides each and every novel feature, element, combination, step and/or method disclosed or suggested by this patent application.

DETAILED DESCRIPTION OF THE BEST MODES AND PREFERRED EMBODIMENTS OF THE INVENTION

Figure 1:
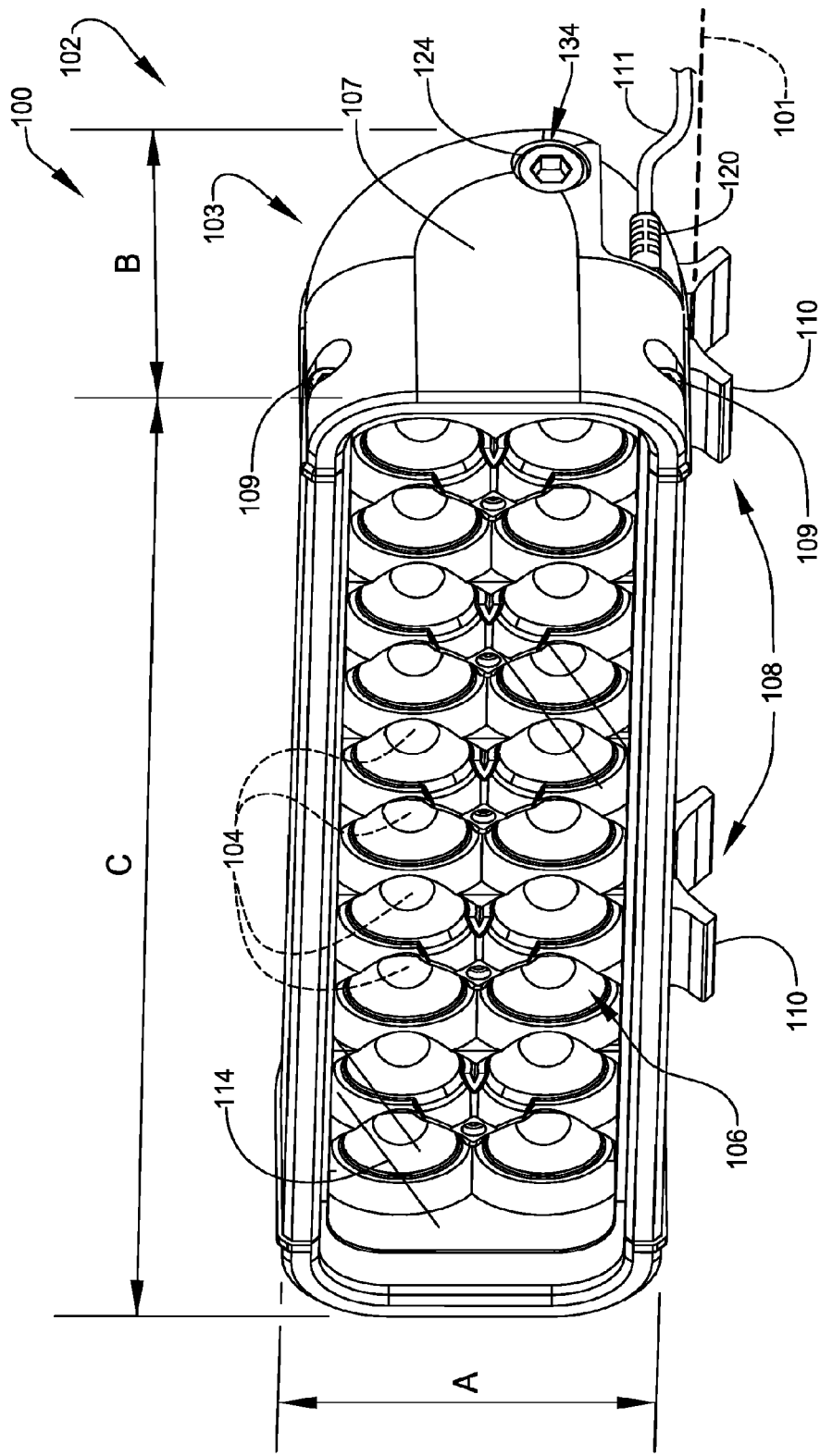
FIG. 1 shows a perspective view illustrating a light bar assembly according to a preferred embodiment of the present invention.

FIG. 1 shows a perspective view illustrating light bar assembly 102 according to a preferred embodiment of the present invention. Preferred embodiments of auxiliary lighting system 100, including light bar assembly 102, preferably comprise compact, rugged, and lightweight vehicle-mountable lighting units especially useful in providing forward directed externally mounted lighting.

Light bar assembly 102 preferably comprises an elongated outer housing assembly 103 having a relatively compact linear profile, as shown. The preferred outer dimensions of light bar assembly 102 comprises a top-to-bottom height A of about three inches and a front-to-back depth B of about four inches, allowing the assembly to be mounted inside spaces of a vehicle that standard or traditional lights would not fit. This preferred physical format assist in adapting the system to a wide range of vehicle platforms.

Preferably, outer housing assembly 103 utilizes a modular design allowing the development of variable embodiment lengths, preferably comprising a minimum length C of about four inches, preferably extending incrementally upward to lengths C limited only by the physical size and electrical capacity of the vehicle to which the system is mounted. Preferred system lengths include 4, 6, 8, 12, 16, 22, 32, 42 and 52-inch lengths.

Preferably, light bar assembly 102 comprises an internal light-generating component identified herein as linear light module 106. Linear light module 106 preferably comprises many compact light-generating elements, preferably organized in an elongated geometric assembly, as shown, rather than utilizing a single large light-generating element as found in conventional vehicle lamps.

The preferred light-producing elements of linear light module 106 preferably comprise electrically driven light emitting diodes (hereinafter referred to as LEDs 104). LEDs 104 are most preferred for their compact size, in-service durability, low power consumption, instantaneous response, and relatively high light output. In the frontal views of FIG. 1 and FIG. 3, the locations of the multiple LEDs 104 of linear light module 106 are visible through the substantially transparent front protective cover 114. Preferably, linear light module 106 is protectively sealed within outer housing assembly 103, as shown (at least embodying herein at least one linear housing, comprising at least one housing length, structured and arranged to house such at least one linear light module). The following figures illustrate and describe preferred outer physical features and arrangements of outer housing assembly 103.

Figure 2:
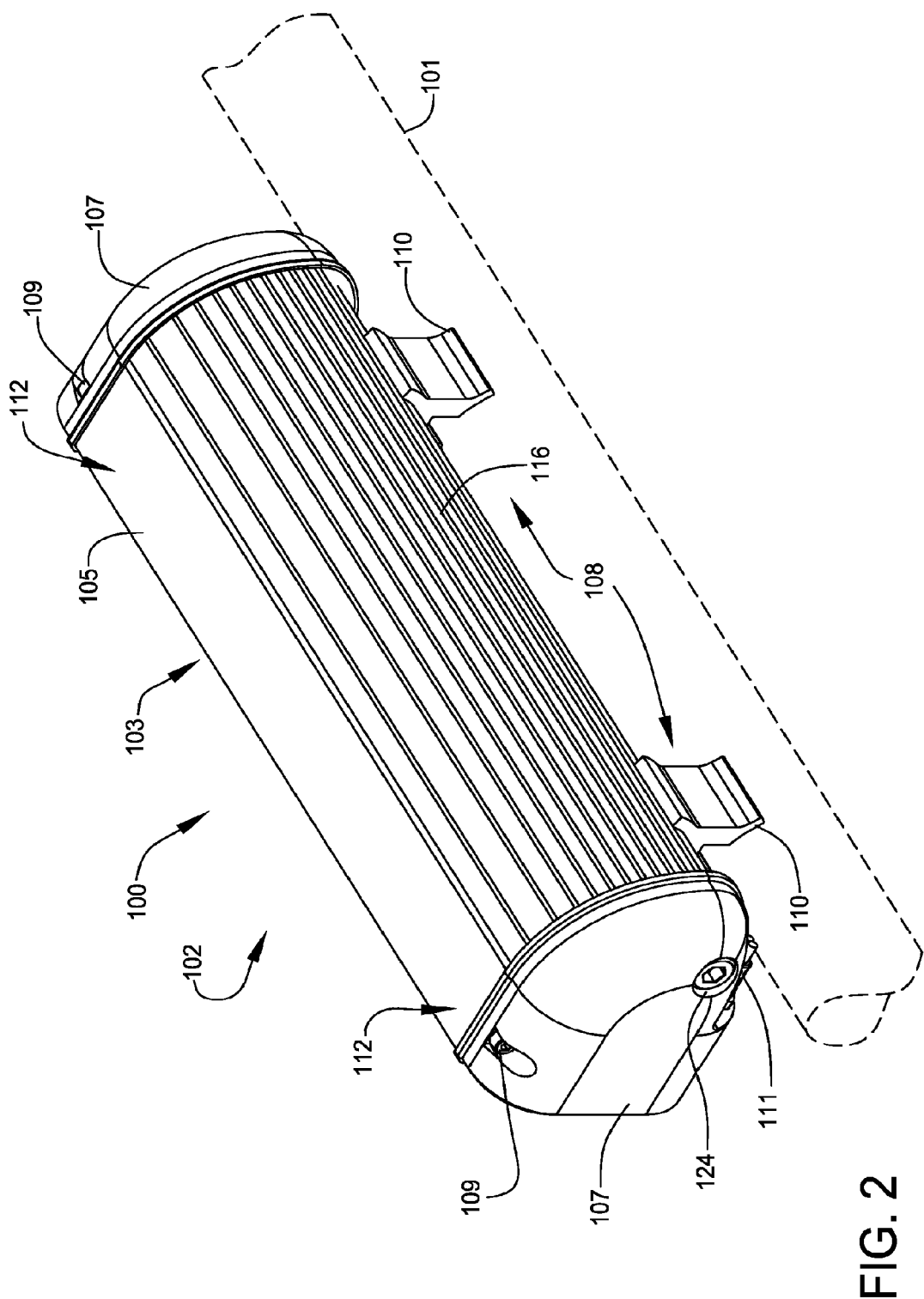
FIG. 2 shows a rear perspective view, illustrating the light bar assembly, according to the preferred embodiment of FIG. 1.
Figure 3:
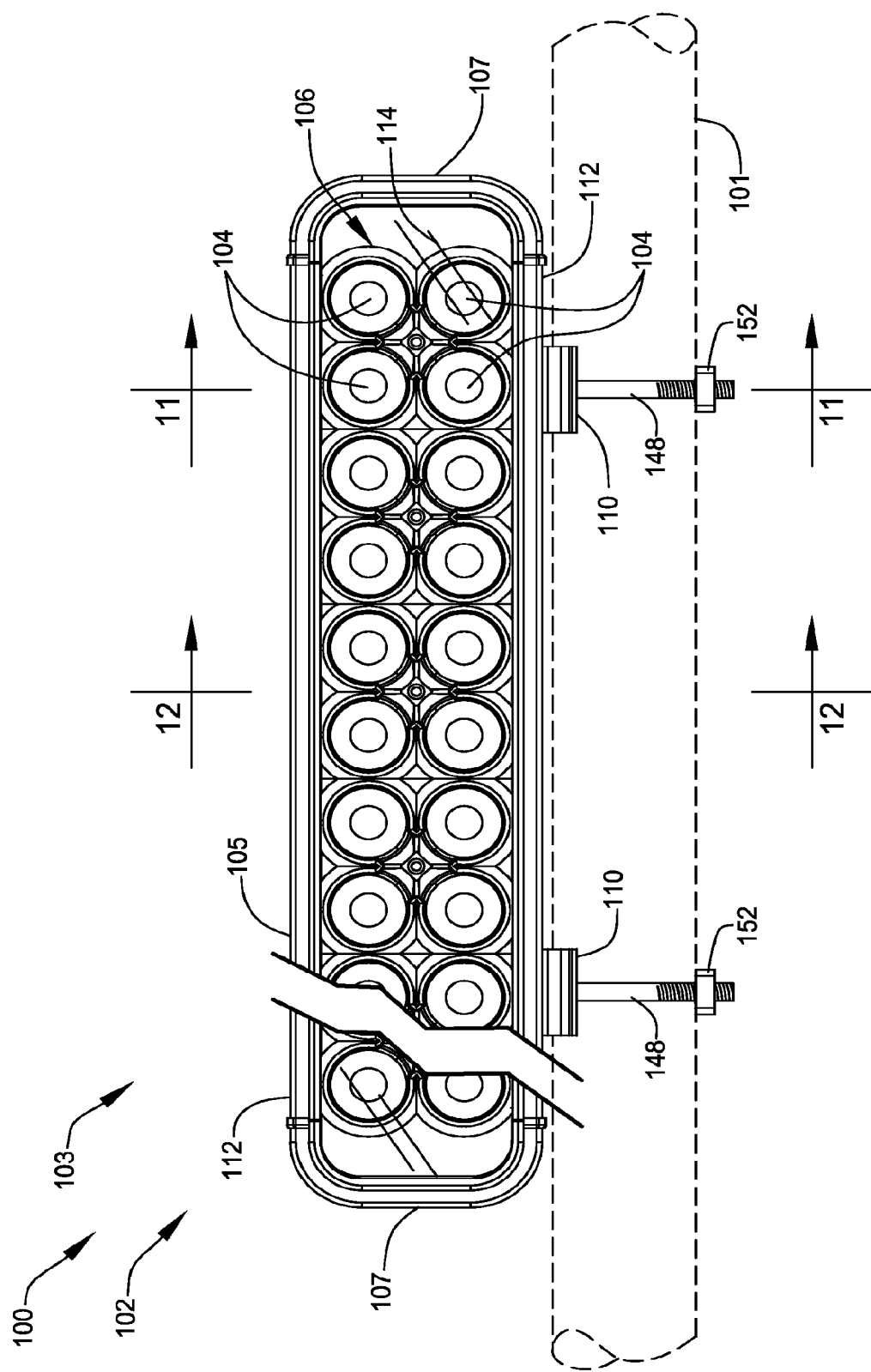
FIG. 3 shows a front view, with a sectional cut to indicate variable length, illustrating the light bar assembly of FIG. 1.
Figure 4:
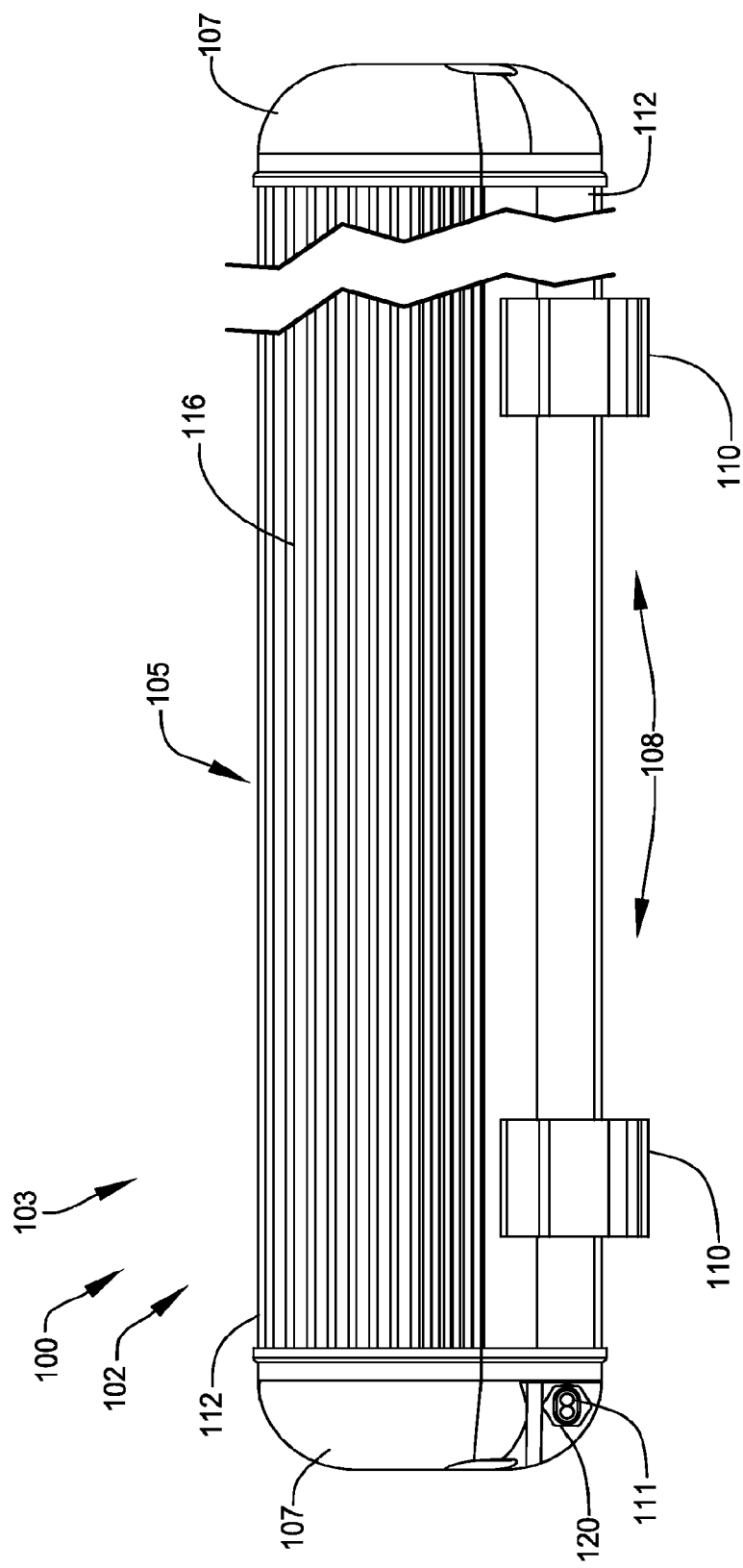
FIG. 4 shows a rear view illustrating the light bar assembly of FIG. 1.
Figure 5:
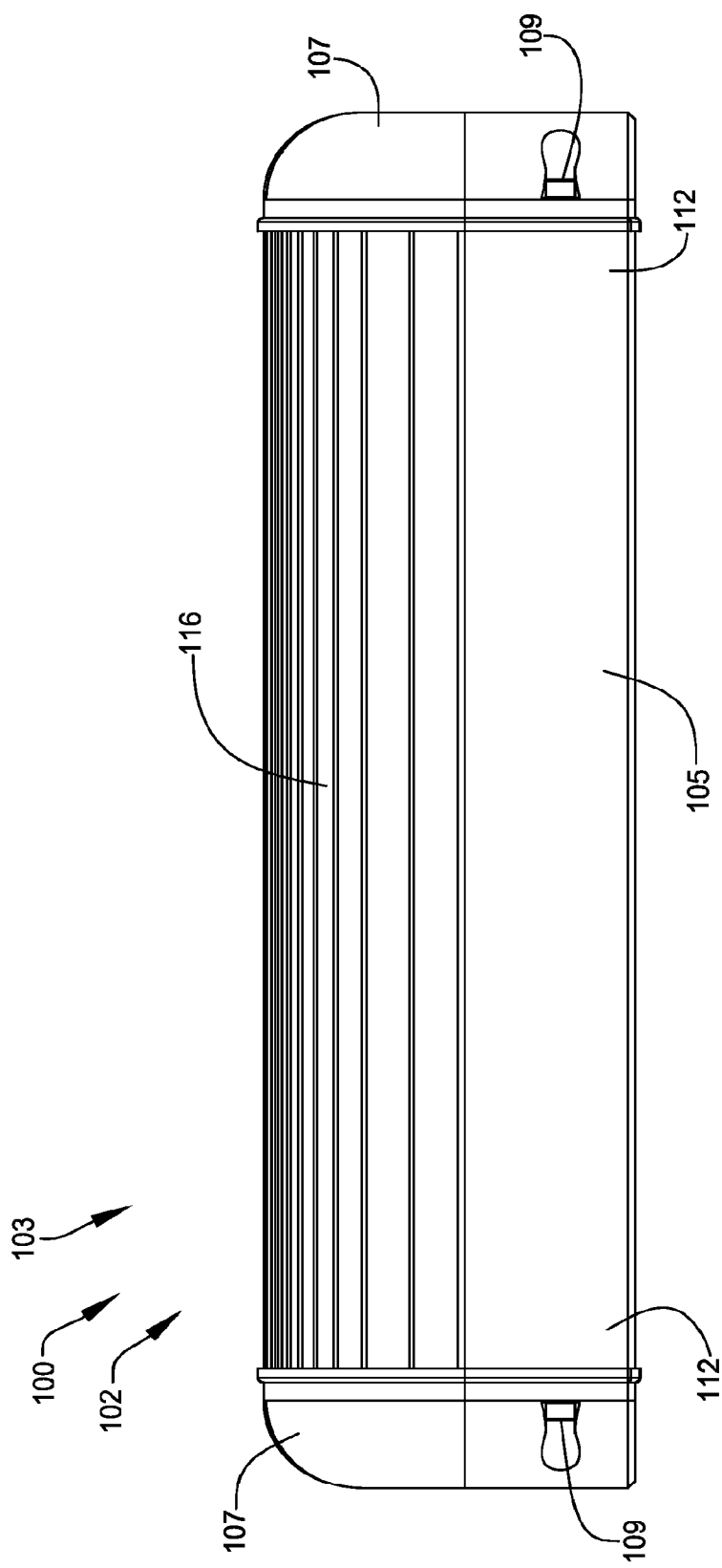
FIG. 5 shows a top view of the light bar assembly of FIG. 1.
Figure 6:
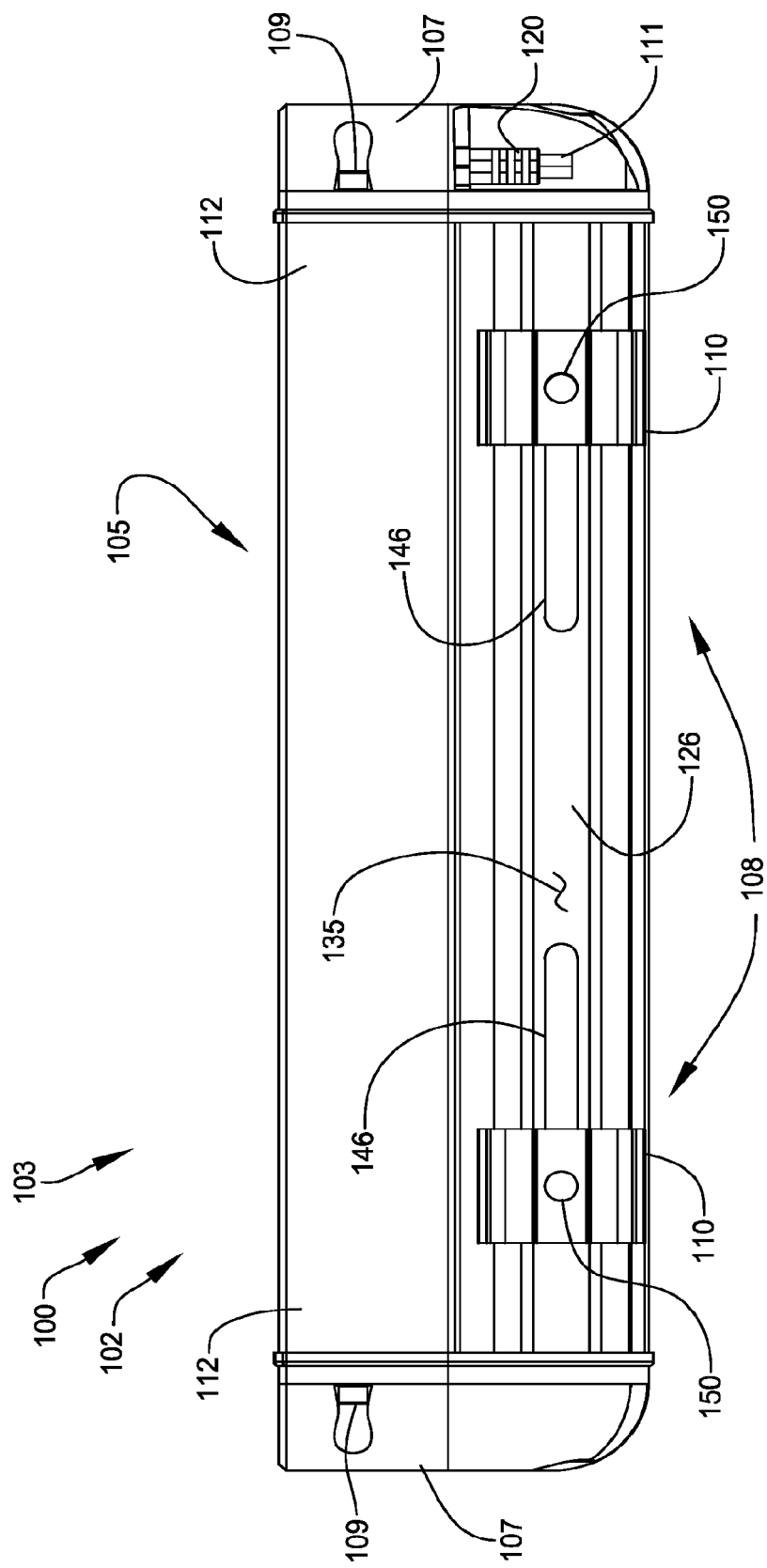
FIG. 6 shows a bottom view of the light bar assembly of FIG. 1.
Figure 8:
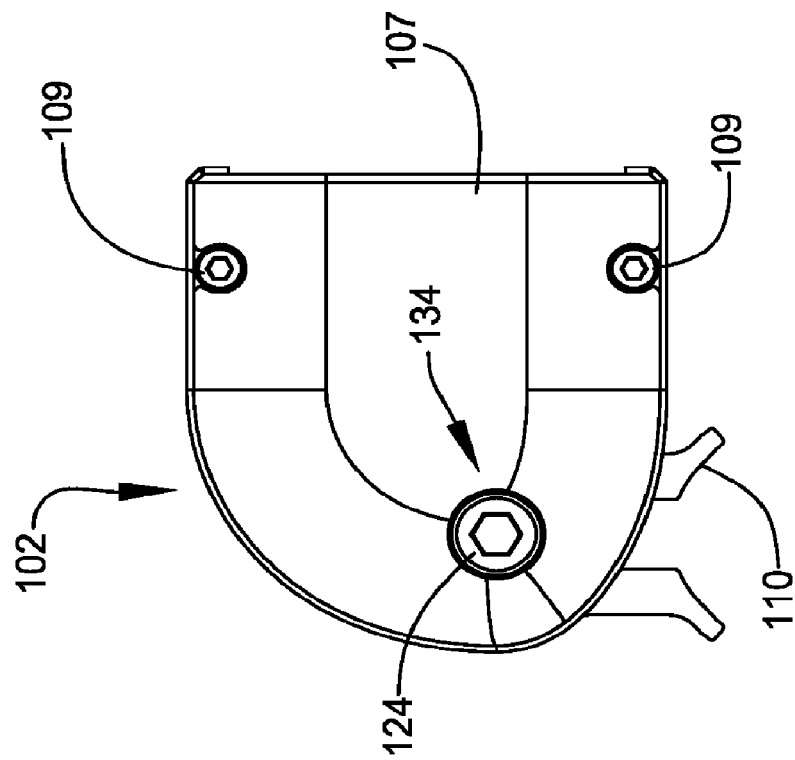
FIG. 8 shows a second-end view of the light bar assembly of FIG. 1.
Figure 7:
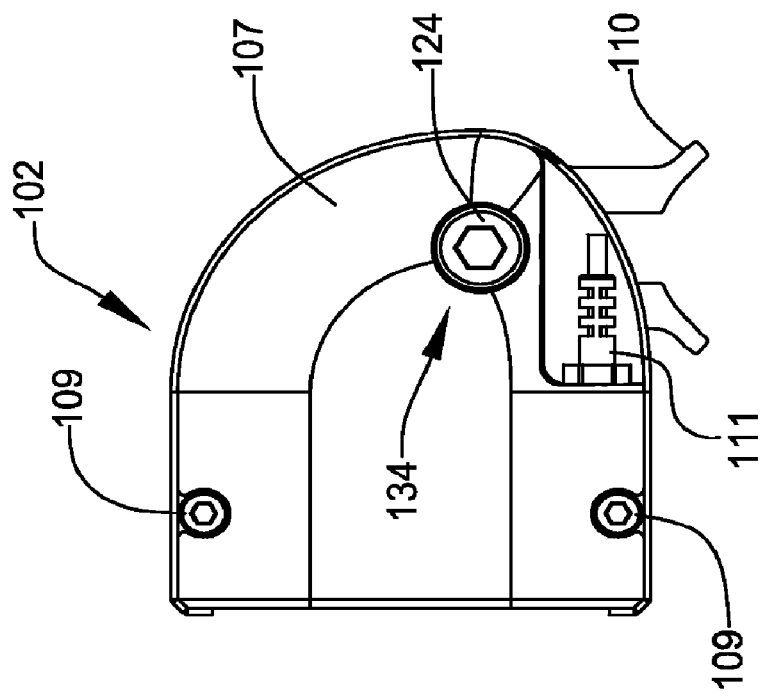
FIG. 7 shows a first-end view of the light bar assembly of FIG. 1.

FIG. 2 shows a rear perspective view, illustrating outer housing assembly 103, according to the preferred embodiment of FIG. 1. FIG. 3 shows a front view illustrating preferred external arrangements of outer housing assembly 103 of FIG. 1 (the sectional cuts within the figures indicating variable housing length). FIG. 4 shows a rear view illustrating preferred rear external configurations of outer housing assembly 103. FIG. 5 shows a top view of outer housing assembly 103. FIG. 6 shows a bottom view of the outer housing assembly 103 of FIG. 1. FIG. 7 shows a first-end view of outer housing assembly 103 and FIG. 8 shows a second-end view of outer housing assembly 103. Reference is now made to FIG. 2 through FIG. 8 with continued reference to FIG. 1.

Outer housing assembly 103 preferably functions as a rigid weather-tight enclosure to protectively support the internal components of light bar assembly 102. Preferably, outer housing assembly 103 comprises central housing section 105, end caps 107, and mounting assembly 108, as shown.

Mounting assembly 108 preferably assists in the mounting of outer housing assembly 103 to a mountable surface of an underlying vehicle (e.g., rollover bars, light bars, bumper bars, a cab surface, etc.). Preferably, mounting assembly 108 (at least embodying herein at least one mounting assembly structured and arranged to assist mounting of such at least one linear housing to at least one mountable surface) includes two or more attachment legs 110 used to firmly attach outer housing assembly 103 to vehicle 101 (at least embodying herein at least one attacher). Preferably, attachment legs 110 are spaced at regular intervals along the length of outer housing assembly 103, as shown. Preferably, each attachment leg 110 extends outwardly from mounting assembly 108, as shown, to elevate outer housing assembly 103 away from the underlying vehicle 101. Preferably, to facilitate the mounting of outer housing assembly 103 to a wide range of vehicle configurations, each attachment leg 110 is positionally adjustable along the length of outer housing assembly 103, as further described below (at least embodying herein, moveably coupled with such at least one elongated support bar, at least one attacher structured and arranged to assist fixed attachment of such at least one elongated support bar to the at least one mountable surface).

Central housing section 105 preferably comprises an elongated, channel-shaped member having opposing open end portions 112 each capped respective by end caps 107, as shown. Central housing section 105 preferably comprises an aluminum extrusion cut to a length selected to coincide with the preferred modular-based dimension scheme of auxiliary lighting system 100. Most preferably, the system's modular length unit is based on a two-inch module. Upon reading the teachings of this specification, those of ordinary skill in the art will now understand that, under appropriate circumstances, considering such issues as intended use, system of measurement, component selection, etc., other modular arrangements, such as utilizing alternate modular dimensional unit (metric units), etc., may suffice.

Preferably, each end cap 107 is firmly joined to its respective end portion 112 using semi-permanent fasteners, more preferably mechanical fasteners, most preferably a plurality of threaded fasteners 109, as shown. Preferably, to block the intrusion of water, dust, and other environmental infiltrates into outer housing assembly 103, at least one side gasket 113 (see FIG. 9) is placed between the interface of each end portion 112 and respective end cap 107 during assembly.

Prominently visible in the frontal views of light bar assembly 102 is front protective cover 114, as shown, occupying substantially the entire frontal region of outer housing assembly 103. Preferably, front protective cover 114 comprises a substantially transparent composition enabling the outward passage of light produced by the underlying linear light module 106. Preferably, front protective cover 114 is retained within outer housing assembly 103 by engagement with central housing section 105 and both end cap 107, as further described below.

Heat generated by LEDs 104 during operation is rejected to the surrounding environment primarily through an heat-dissipating fins 116 located on the rear portion of central housing section 105, as best shown in the rear views of FIG. 2 and FIG. 4. Preferably, heat-dissipating fins 116 are integrally formed within the extruded profile of central housing section 105 and function to increase the heat-dissipation the overall heat-rejecting surface area of central housing section 105 (at least embodying herein at least one at least one external heat-rejection region structured and arranged to assist rejection of the heat from such at least one extruded member to a surrounding environment, wherein such at least one external heat-rejection region comprises a plurality of fins structured and arranged to provide increased surface area in thermal communication with the surrounding environment).

Electrical power to energize light bar assembly 102 is preferably routed to linear light module 106 by means of at least one electrical supply cord 111, preferably routed through feed-through aperture 121 within one of the two end caps 107, as shown. Preferably, electrical supply cord 111 is electrically coupled to both linear light module 106 and at least one electrical power source (for example, the onboard electrical system of vehicle 101). Preferably, electrical supply cord 111 comprises at least one electrical conductor (when a grounded vehicle chassis is utilized to complete the circuit), more outer sheath. Upon reading the teachings of this specification, those of ordinary skill in the art will now understand that, under appropriate circumstances, considering such issues as intended use, etc., other electrical supply arrangements, such as the inclusion of ground wires, onboard battery power supplies, onboard switching devises, control circuiting for focusing/positioning servos, etc., may suffice. Preferably, electrical supply cord 111 comprises an annular sealing grommet 120 structured and arranged form a substantially fluid-resistant seal between electrical supply cord 111 and feed-through aperture 121. Preferably, annular sealing grommet 120 is disposed about electrical supply cord 111 and may be preferably molded integrally with the outer sheath, as shown. Annular sealing grommet 120 preferably comprises a generally resilient material capable of forming a compression seal with feed-through aperture 121. Upon reading the teachings of this specification, those of ordinary skill in the art will now understand that, under appropriate circumstances, considering such issues as intended use, cost, etc., other sealing arrangements, such as utilizing detachable connectors, waterproof sealants, etc., may suffice.

Figure 9:
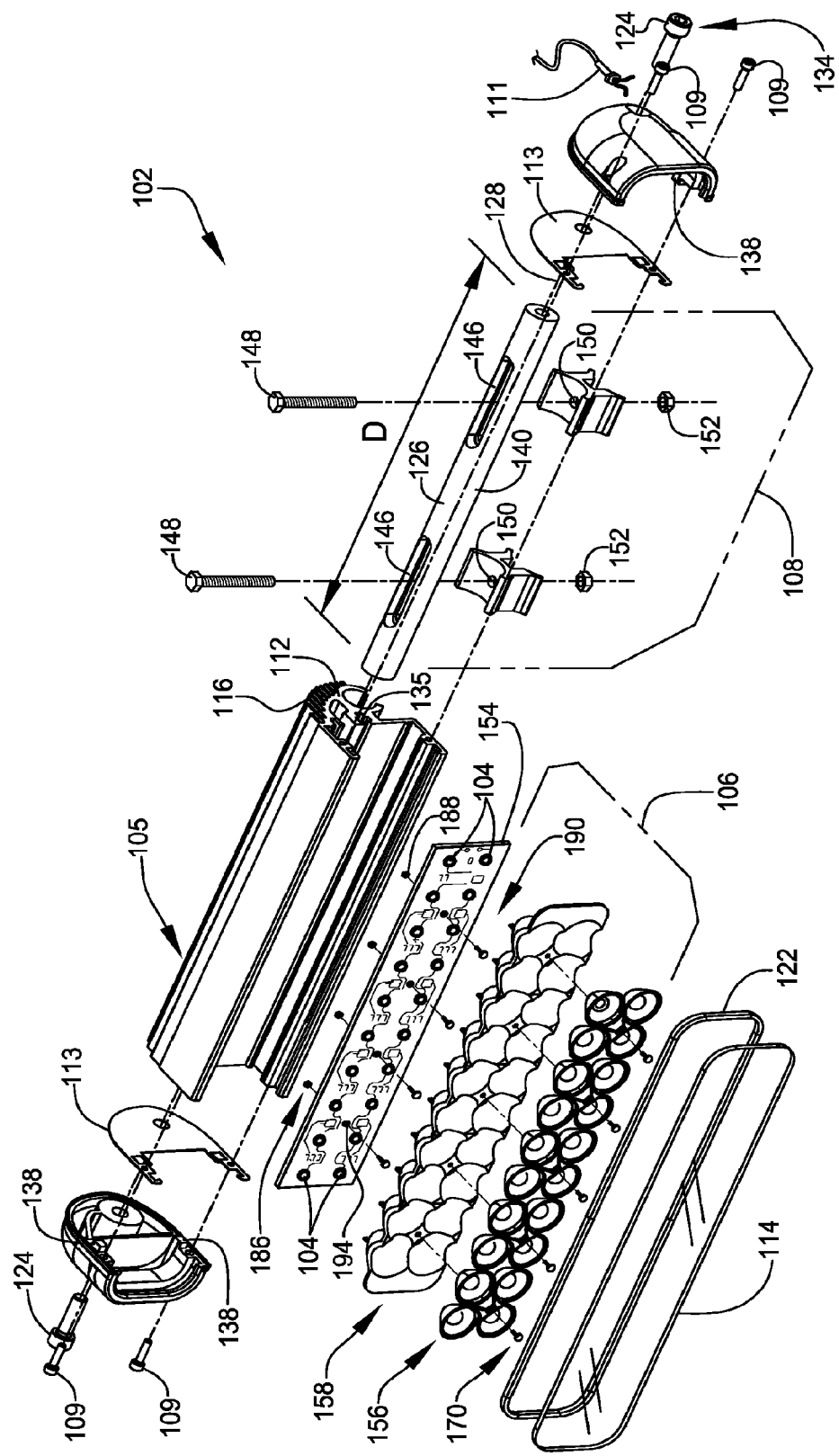
FIG. 9 shows a front exploded view of the light bar assembly according to the preferred embodiment of FIG. 1.
Figure 10:
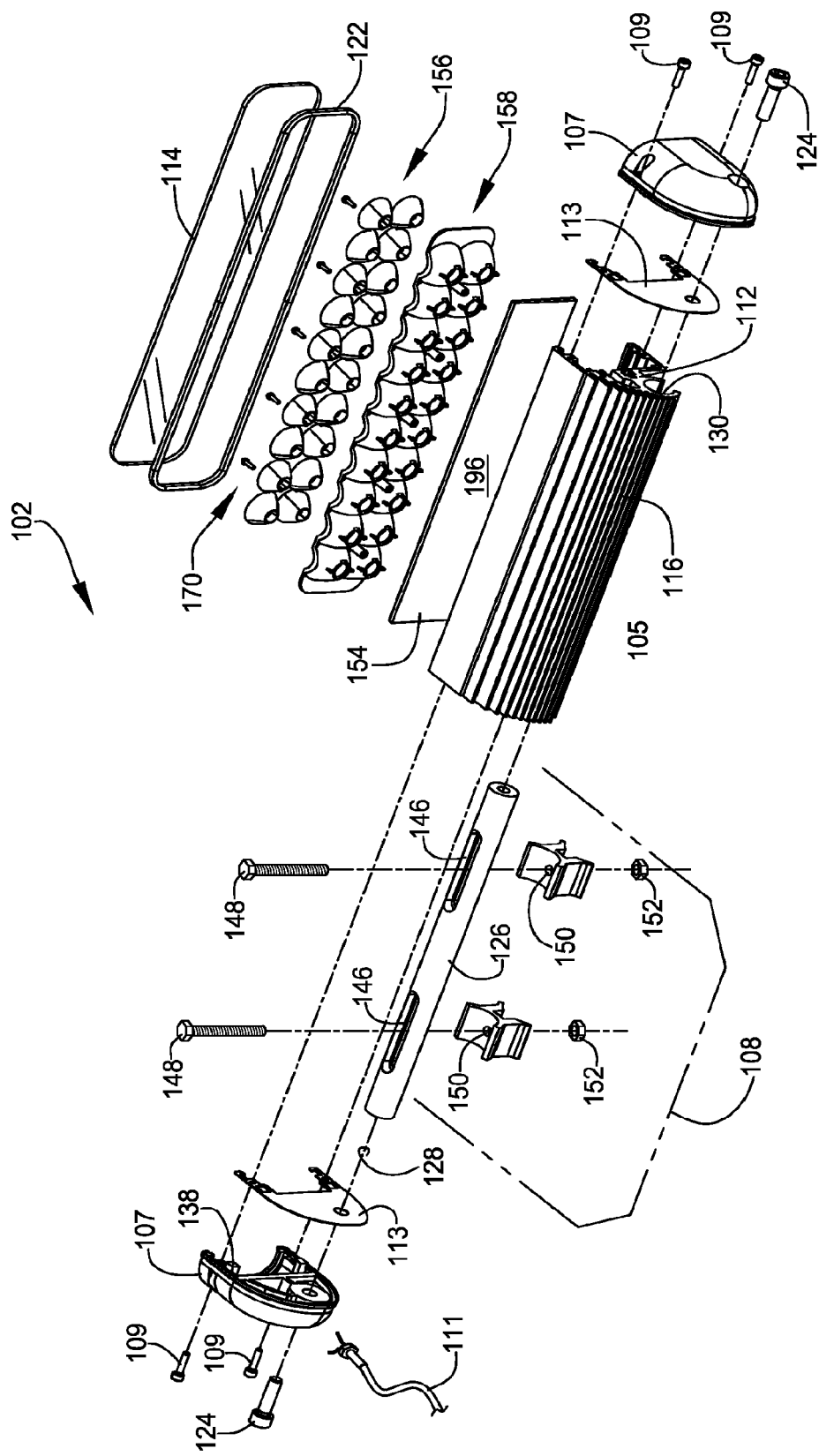
FIG. 10 shows a rear exploded view of the light bar assembly according to the preferred embodiment of FIG. 1.

FIG. 9 shows a front exploded view of light bar assembly 102. FIG. 10 shows a rear exploded view of light bar assembly 102 according to the preferred embodiment of FIG. 1. Both FIG. 9 and FIG. 10 show preferred external and internal components of light bar assembly 102 including central housing section 105, end caps 107, mounting assembly 108, front protective cover 114, side gaskets 113, front peripheral gasket 172, threaded fasteners 109, and threaded end lock 124, as shown.

Central housing section 105 is preferably constructed from a rigid material having good thermal conduction characteristics, preferably comprising a heat-transfer coefficient in the range of between about 75 and 235 W m$^{-1}$ K$^{-1}$ W/m K. In addition, the preferred material of central housing section 105 must be capable of sustaining a continuous operational temperature of at least 85 degrees Centigrade without degradation. Preferred materials include metallic compositions, most preferably an extrusion-formed aluminum alloy. Upon reading the teachings of this specification, those of ordinary skill in the art will now understand that, under appropriate circumstances, considering such issues as intended use, material cost, etc., other arrangements, such as the use of composite structures, engineered plastics, alternate metals, etc., may suffice.

The preferred cross-sectional profile of central housing section 105 comprises a continuous internal hollow cavity 136 structured and arranged to house and securely position linear light module 106. A preferred sectional profile of central housing section 105 is illustrated in FIG. 25.

End caps 107 are preferably constructed from a substantially rigid material, preferably a solid metal, most preferably die-cast aluminum. Each end cap 107 comprises an internal channel 127 adapted to receive and retain an end portion front protective cover 114 and projecting alignment tabs 138 to assist in properly aligning end caps 107 with its respective side gasket 113 and open-end portion 112 of central housing section 105. In addition, each end cap 107 preferably comprises an arrangement of apertures to accommodate the passage of threaded fasteners 109 to central housing section 105, threaded end locks 124 to elongated support bar 126, and, if applicable, electrical supply cord 111 to linear light module 106.

Mounting assembly 108 preferably includes elongated support bar 126, two or more attachment legs 110, and threaded fasteners 148. Elongated support bar 126 preferably comprises a longitudinal axis 128 and length D substantially matching length C of outer housing assembly 103, as shown. Elongated support bar 126 preferably comprises a substantially uniform circular section, preferably comprising an outer diameter of about ¾ inch. Preferably, elongated support bar 126 is engaged within central housing section 105 by placement within a hollow cylindrical bar-receiving channel 130. Bar-receiving channel 130 preferably extends through the full longitudinal length of central housing section 105, as shown, thus allowing substantially the entire bar length D of elongated support bar 126 to be received therein. When engaged within bar-receiving channel 130, elongated support bar 126 functions to continuously support light bar assembly 102 along substantially the full length C of outer housing assembly 103. Preferably, elongated support bar 126 is retained within bar-receiving channel 130 by the end caps 107 mounted to each end of central housing section 105, as shown. A continuous slot opening 135, preferably oriented toward the bottom portion of central housing section 105, extends along preferably the full length of bar-receiving channel 130 to allow for continuous access to elongated support bar 126 during engagement. This preferred physical feature allows attachment legs 110 to be moved to various positions along light bar assembly 102, even after attachment legs 110 are coupled to elongated support bar 126, as described below.

Preferably, threaded fasteners 148 are used to mount attachment legs 110 to both elongated support bar 126 and the underlying vehicle 101. In a preferred assembly, each threaded fastener 148 is passed through a slotted hole 146 of elongated support bar 126, passing through continuous slot opening 135 and aperture 150 of attachment leg 110 to engage support structure 119 of the underlying vehicle 101 (see also FIG. 11). Preferably, a compatible nut 152 is engaged on the portion of threaded fastener 148 extending through support structure 119. Tensioning of nut 152 against underlying support structure 119 preferably retains attachment leg 110, and the overall light bar assembly 102, to the underlying vehicle 101. In addition, tensioning of nut 152 also enables the engagement of first positional retainer at 132, as further described in FIG. 11.

It is important to note that the preferred use of slotted holes 146 within elongated support bar 126 provides to each attachment leg 110 a degree of translational movement along elongated support bar 126 in a preferred orientation generally parallel with longitudinal axis 128 (at least embodying herein wherein such at least one elongated support bar comprises at least one elongated slot structured and arranged to allow translational movement of such at least one threaded tensioner substantially parallel with such at least one longitudinal axis; and at the least embodying herein wherein such at least one attacher comprises at least one axial translator structured and arranged to assist axial translation of such at least one attacher along at least one translational axis oriented substantially parallel to such at least one longitudinal axis of such at least one elongated support bar). The preferred use of multiple slotted holes 146 within the length of elongated support bar 126 provides mounting assembly 108 with a wide range of adjustability. Thus, each attachment leg 110 is preferably coupled to outer housing assembly 103 such that it may slide along the lower portion of outer housing assembly 103 to match the spacing of substantially any mounting hole that may exist or be formed within the underlying vehicle 101.

Elongated support bar 126 is preferably formed from a substantially rigid material, preferably a metallic material, preferably a metallic material matching the composition of central housing section 105, most preferably an aluminum alloy. Preferably, the inner diameter of bar-receiving channel 130 is sized to allow substantially free rotation of outer housing assembly 103 about elongated support bar 126. Thus, the above-described arrangements allow light bar assembly 102 to be pivoted about longitudinal axis 128 to a user-selected orientation most beneficial to the lighting requirements of the underlying vehicle 101. A selected rotational position of light bar assembly 102 is preferably maintained by engaging either of two retainer assemblies identified herein as first positional retainer 132 and second positional retainer 134.

Preferably, first positional retainer 132 functions to bias outer surface 140 of elongated support bar 126 toward a position of contact with inner surface 142 of bar-receiving channel 130. Preferably, both elongated support bar 126 and its outer surface 140 are fixed relative to the underlying vehicle 101 by attachment legs 110, thus, the frictional interaction between the outer surface 140 of elongated support bar 126 against inner surface 142 maintains light bar assembly 102 in a selected fixed rotational position. The preferred apparatus arrangements of first positional retainer 132 are further described in the sectional view of FIG. 11.

Second positional retainer 134 is also structured and arranged to assist in retaining light bar assembly 102 in a fixed rotational position relative to elongated support bar 126. Preferably, second positional retainer 134 comprises a set of threaded end locks 124 preferably adapted to be threadably engaged within a respective end of elongated support bar 126, after passage through its respective end cap 107, as shown. In preferred operation, threaded end locks 124 are tightened against a respective end cap 107 to form a frictional hold between the cap and elongated support bar 126. This preferred arrangement functions to hold elongated support bar 126 in the fixed rotational position relative to the fixed elongated support bar 126. Preferably, each threaded end lock 124 comprises a threaded coupler, preferably a threaded bolt, most preferably a cap bolt comprising a hex socket, as shown. It is noted that one or both of the above-described retainers may be used independently, or more preferably, in combination. Upon reading the teachings of this specification, those of ordinary skill in the art will now understand that, under appropriate circumstances, considering such issues as intended use, cost, advances in technology, etc., other retaining arrangements, such as remotely controllable motorized pivot mechanisms, fixed (non-adjustable) mountings, pin/socket-based retainers, manual cranks, screws, etc., may suffice.

Linear light module 106 preferably comprises a multipart assembly consisting of a specially constructed composite printed circuit board (CPCB 154), a plurality of focusing lenses 156, and a plurality of lens positioners 158 adapted to position the plurality of focusing lenses 156 in an operable position adjacent CPCB 154, as shown.

Figure 13:
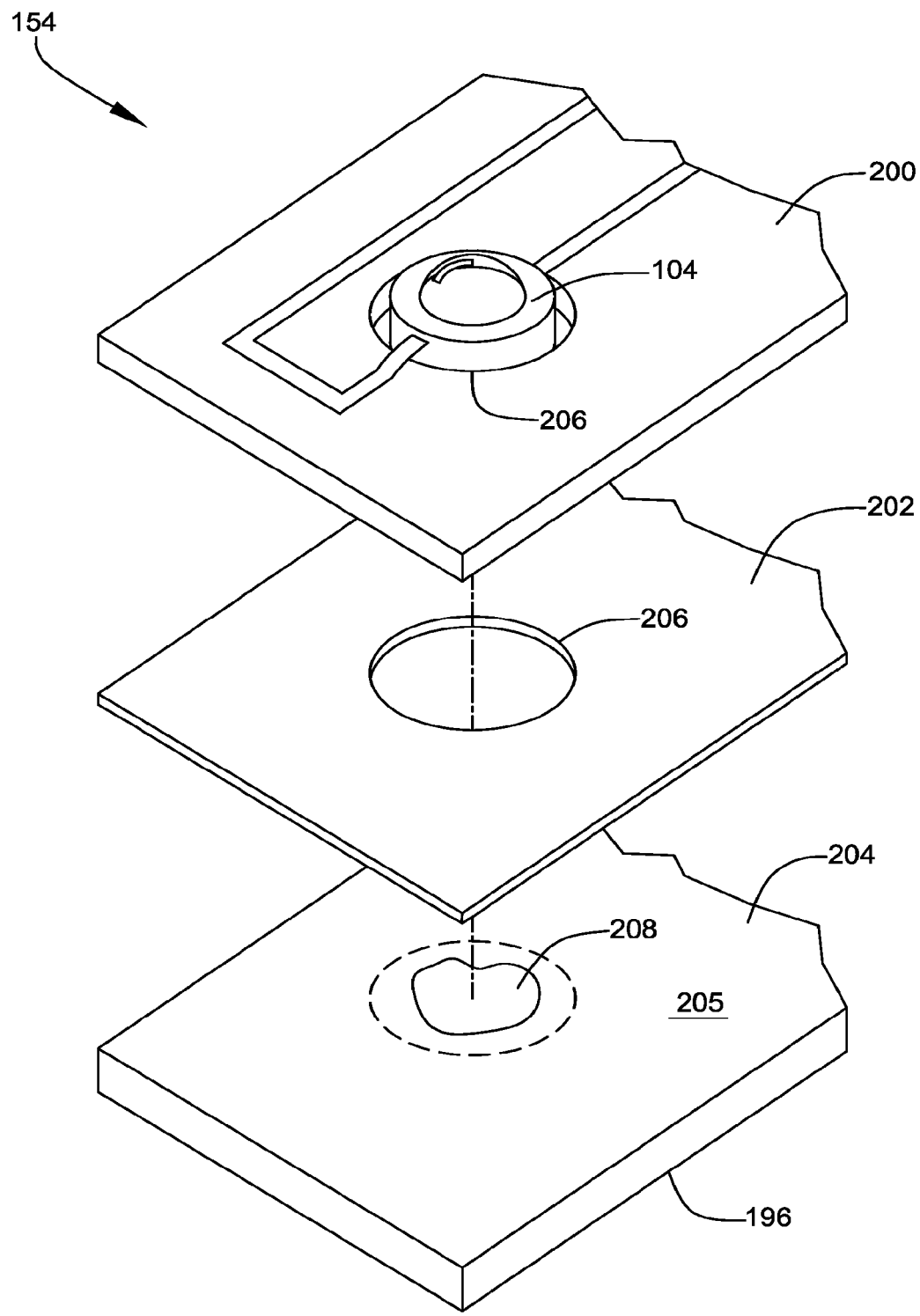
FIG. 13 shows an exploded perspective view diagrammatically illustrating preferred components of a heat-dissipation assembly according to a preferred embodiment of the present invention.

The front surface of CPCB 154 preferably comprises a plurality of discrete light sources in the form of LEDs 104, as shown. Each LEDs 104 preferably comprises an individual emitter package mounted to CPCB 154 using a unique heat-rejecting mounting arrangement, as shown in FIG. 13. Center-to-center spacing of individual LEDs 104 preferably occurs at 1-inch intervals enabling the development of the preferred modular embodiment lengths. In the preferred embodiment depicted in FIG. 9 and FIG. 10, CPCB 154 comprises 20 individual LEDs 104, as shown.

Each LED 104 preferably comprises a low-voltage direct-current (DC) operated emitter. Preferred emitters include the EDISON KLC8 LED, alternately preferably 3-watt LED packages produced under the Luxeon trademark by Philips Lumileds Lighting Company of San Jose, Calif. The outer encapsulating package of LED 104 preferably comprises a clear cover or lens element, which is generally hemispherical in shape and from which light from LED 104 is directed.

CPCB 154 preferably comprises interface circuiting adapted to supply suitable electrical current to each of the plurality of mounted LEDs 104. The preferred implementation of such interface circuiting is dependent on several design factors including the number of LEDs 104 within linear light module 106, operational specifications of the selected LED devices, and manufactures recommendations for the application and use of such LED devices. Thus, engineering and design of preferred embodiments CPCB 154 may include the integration of electronic components/devices to control current and or voltage supplied to the LEDs 104, as selected and applied by one of ordinary skill in the art.

Another highly preferred aspect of CPCB 154 is the efficient heat dissipation and transfer feature provided by the novel composite structure of CPCB 154. CPCB 154 preferably comprises a multi-layer assembly designed to control the level of thermal heat generated by LEDs 104 during operation. It is known that excessive heat can reduce both the efficiency and lifespan of an LED. CPCB 154 is preferably designed to maintain LEDs 104 within the component's maximum rated temperature during operation. Thermal control by CPCB 154 is preferably accomplished by shunting thermal energy generated by the LEDs from CPCB 154 to the ambient environment by way of the heat-dissipating fins 116 of outer housing assembly 103. Further explanation, including a preferred configuration of CPCB 154, is presented in FIG. 13.

Figure 14:
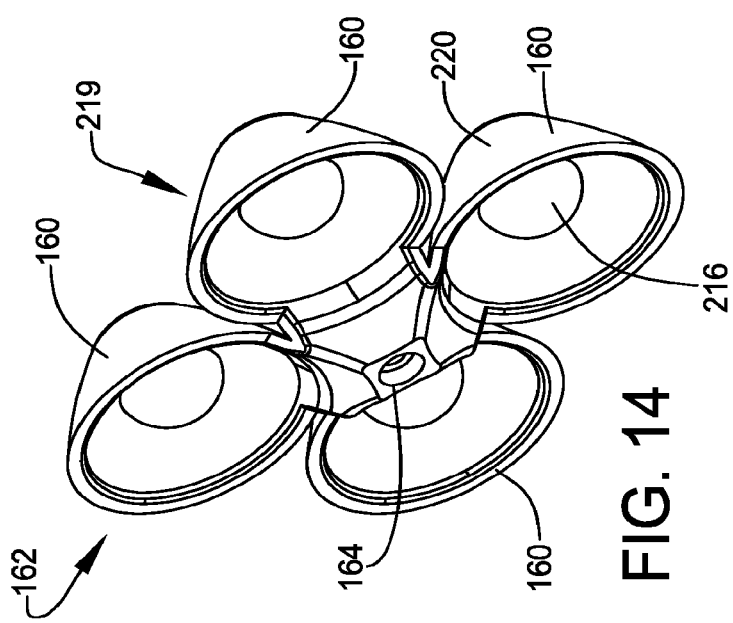
FIG. 14 shows a perspective view of a modular lens element of the light bar assembly of FIG. 1.

The plurality of focusing lenses 156 preferably comprise groupings of four individual lens units 160 unified into a unitary lens module 162 by a central supportive frame 164, as shown (at least embodying herein at least one unifying frame structured and arranged to unify at least four of such at least one focusing lens into a single modular lens element). This preferred arrangement is best illustrated in FIG. 14. In the preferred embodiment depicted in FIG. 9 and FIG. 10, 5 unitary lens modules 162 are arranged side-by-side in a generally linear organization, as shown. Preferably, each lens unit 160 of the unitary lens module 162 is designed to focus the light generated by a single PCB-mounted LED 104 into at least one beam pattern. Preferred optical characteristics of lens units 160 are discussed in FIG. 17.

Lens positioner 158 preferably functions to support unitary lens module 162 in an operable position adjacent to the PCB-mount LEDs 104. Preferably, each lens positioner 158 comprises four cup-like receivers 166, each one adapted to receive a lens unit 160 of its respective unitary lens module 162. In the preferred embodiment depicted in FIG. 9 and FIG. 10, 5 lens positioners 158 are arranged side-by-side in a generally linear organization, as shown.

Preferably, each unitary lens module 162 is coupled to a single respective lens positioner 158 using a single mechanical fastener 170, as shown. This preferred modular arrangement allows for the installation, removal, and replacement of individual unitary lens modules 162 within a bank of unitary lens modules 162. This preferred feature enables development of custom lens combinations, for example, mixed beam patterns comprising combinations of flood beam patterns and spot beam patterns within a single light bar assembly 102. Preferably, mechanical fasteners 170 further function to couple both unitary lens modules 162 and lens positioners 158 to the underlying CPCB 154.

Preferably, the transparent front protective cover 114 is sealed to outer housing assembly 103 using front peripheral gasket 172, as shown. Preferably, front peripheral gasket 172 is preferably engaged between front protective cover 114, cover receiving slots 174 of central housing section 105, and end caps 107 (see FIG. 11). Front peripheral gasket 172 preferably comprises a square sectional profile to increase the sealing area of the gasket. Preferably, both front peripheral gasket 172 and side gaskets 113 function to seal continuous internal hollow cavity 136 from ingress of unwanted environmental infiltrates (fluids, dust, particulate matter, etc.). These preferred arrangements enable outer housing assembly 103 to achieve an IP67 certification. The aforementioned "IP" number is used in the art to specify the environmental protection of enclosures around electronic equipment. These ratings are determined by specific performance tests. The IP number is composed of two numbers, the first referring to the protection against solid objects and the second against liquids. In general, the higher the number, the better the protection afforded by the enclosure.

It is noted that, due to the substantially complete sealing of light bar assembly 102, moisture contained in the air trapped within the internal hollow cavity 136 during assembly sometimes formed a thin film on the inner surface of the transparent front protective cover 114. Applicant determined that a preferred placement of a desiccant within the cavity effectively eliminated this occurrence, even in cold atmospheric temperatures. Preferred desiccant materials include silica gel.

Figure 11:
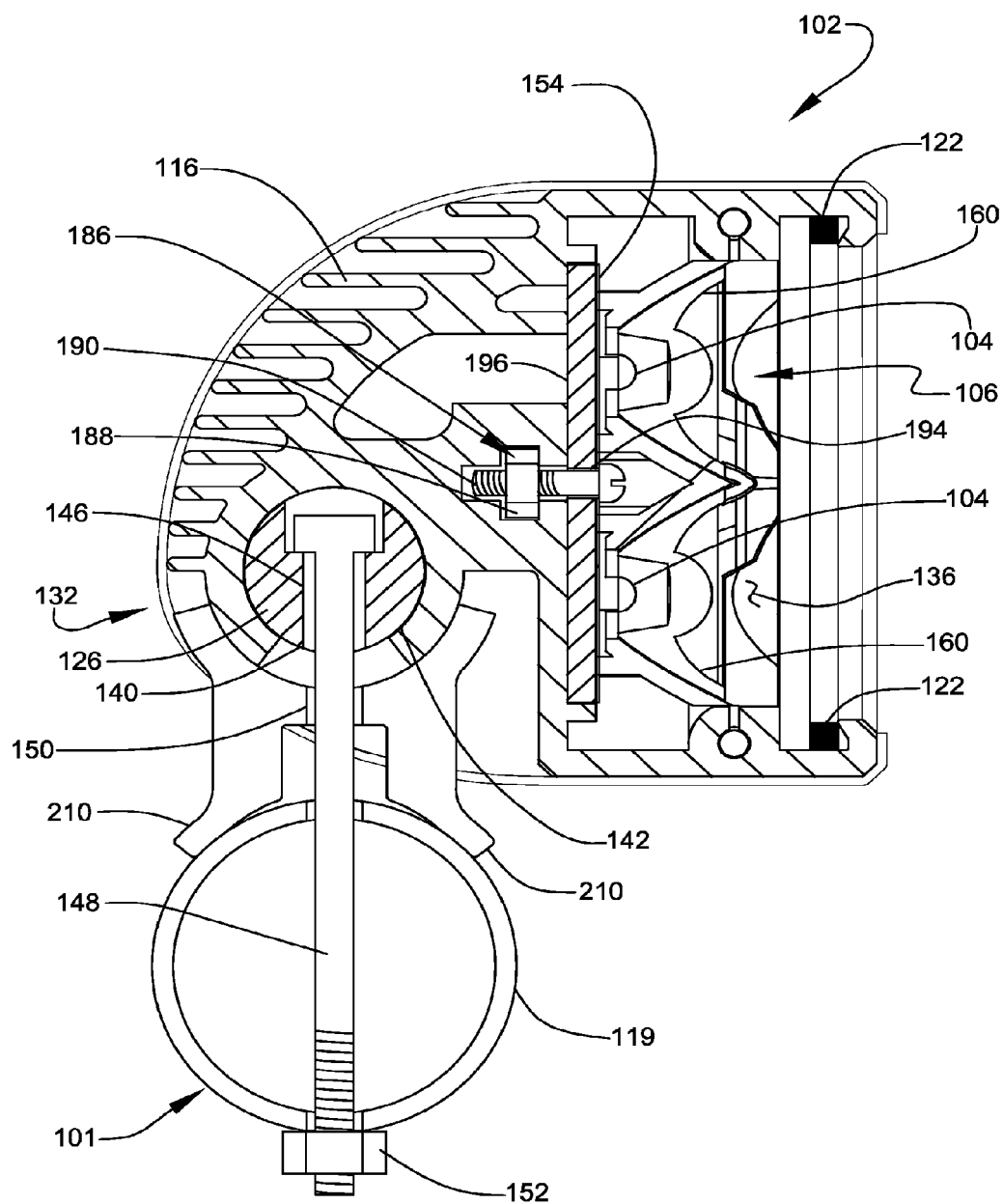
FIG. 11 shows the sectional view 11-11 of FIG. 3 according to the preferred embodiment of FIG. 1.
Figure 12:
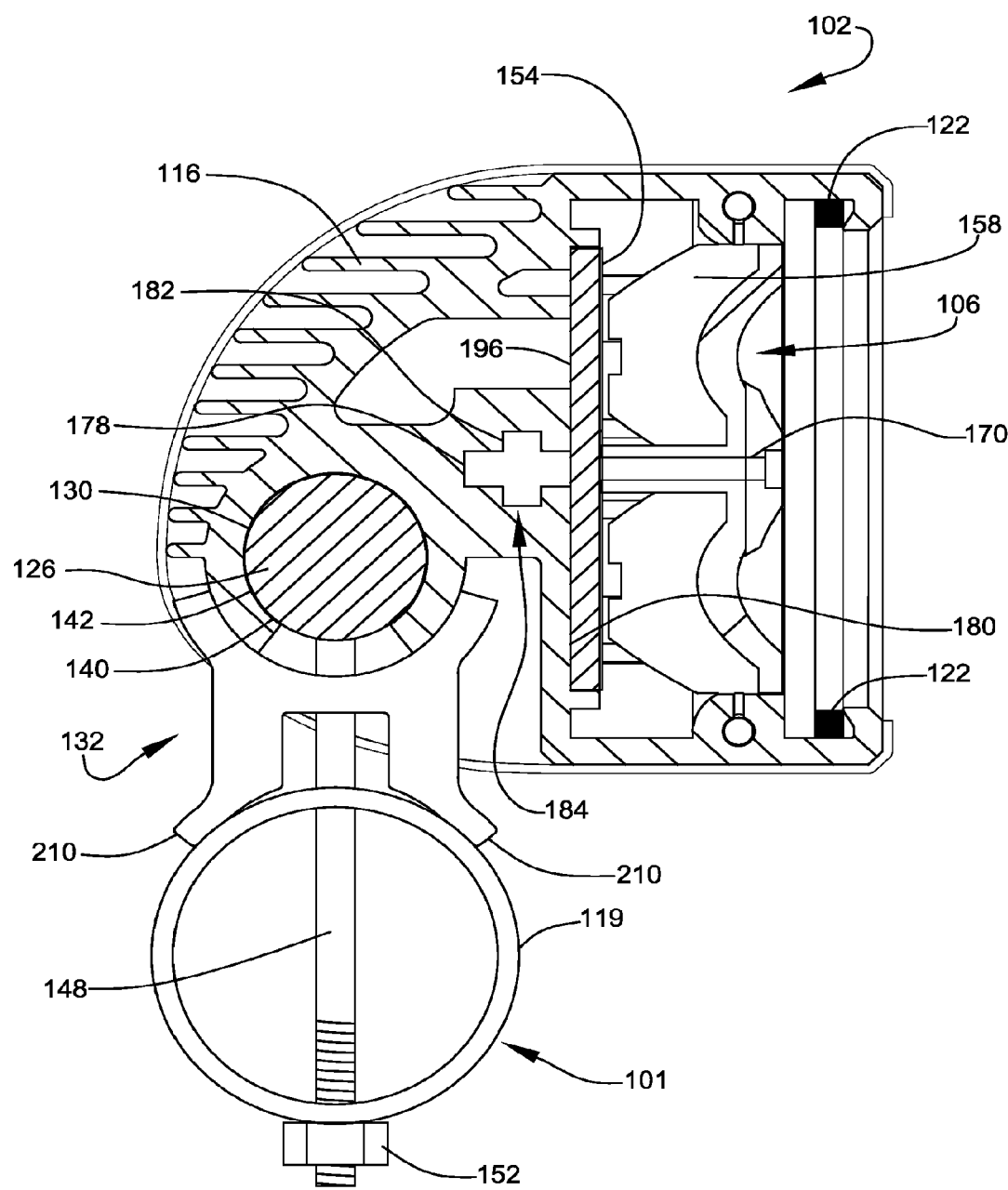
FIG. 12 shows the sectional view 12-12 of FIG. 3 according to the preferred embodiment of FIG. 1.
Figure 21:
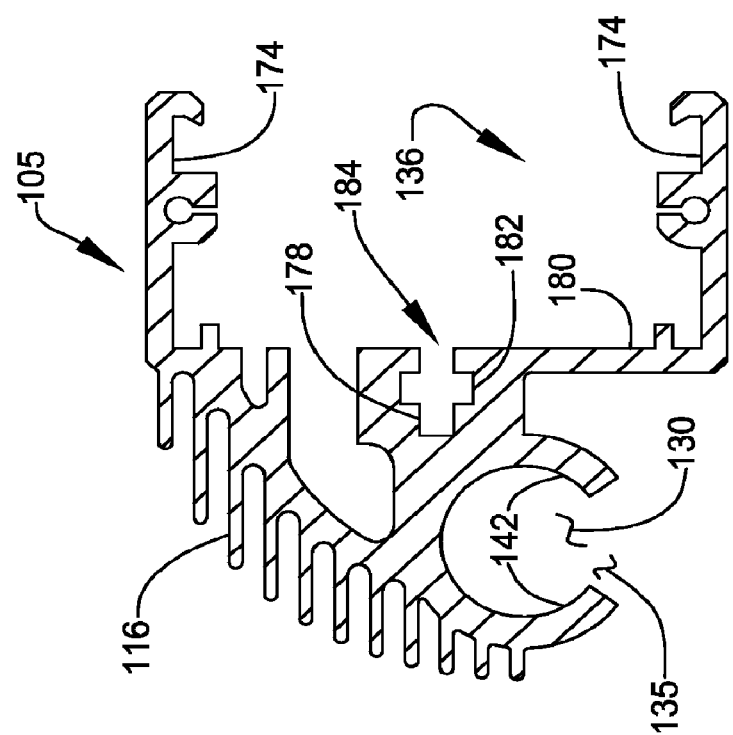
FIG. 21 shows a sectional view, through a transverse section extending through a central housing section of the light bar assembly, according to the preferred embodiment of FIG. 1.

FIG. 11 shows the sectional view 11-11 of FIG. 3 according to the preferred embodiment of FIG. 1. FIG. 12 shows the sectional view 12-12 of FIG. 3 according to the preferred embodiment of FIG. 1. In the following discussion, it is helpful to also refer to the sectional view of FIG. 21. As shown in FIG. 11, FIG. 12, and FIG. 21, linear light module 106 is mounted within continuous internal hollow cavity 136 in direct thermal contact with central housing section 105. Central housing section 105 preferably comprises a first channel 178 set generally perpendicularly within first internal surface 180, as shown. A second channel 182, transverse to and intersecting the first channel 178, is preferably set within central housing section 105 parallel to first internal surface 180, as shown. Preferably, first channel 178 and second channel 182 serve to create a T-shaped-cross-section slot 184 extending substantially the full length of central housing section 105, wherein second channel 182 serves to hold and permit sliding of fastener 186 therein, as shown.

Preferably, fastener 186 comprises nut 188 engaged on attaching screw 190, as shown. Attaching screw 190 is preferably coupled to linear light module 106 by engagement within aperture 194 of linear light module 106, as shown. It is preferable for first channel 178 to extend beyond the second channel 182 so as to accommodate a greater range of lengths of attaching screw 190, which may extend through nut 188, as shown. Preferably, the first channel 178 is sufficiently deep and wide to accommodate attaching screw 190. Preferably, second channel 192 is sufficiently wide and tall to accommodate nut 188.

Preferably, the back face 196 of CPCB 154 is held in direct contact with first internal surface 180 by attaching screw 190 and nut 188. CPCB 154 preferably comprises an aperture 194 every 2 inches along its length, enabling the use of multiple attaching screws 190 to development continuous and even pressure contact between CPCB 154 and first internal surface 180. This preferred arrangement enables an efficient transfer of thermal energy between CPCB 154 and central housing section 105 further enhanced by the preferred physical construction of CPCB 154, as described in FIG. 13.

FIG. 13 shows an exploded perspective view diagrammatically illustrating preferred heat-dissipating assembly of CPCB 154 according to a preferred embodiment of the present invention. CPCB 154 preferably comprises a three-layer composite assembly, as shown. Preferably, CPCB 154 comprises synthetic printed circuit board (PCB 200), bonding layer 202, and thermal transfer plate 204, as shown. Thermal transfer plate 204 preferably comprises two planar surfaces comprising a heat-absorption surface 205 and a heat-dissipating surface, previously identified as back face 196. Preferably, bonding layer 202 (at least embodying herein at least one positioner structured and arranged to position such at least one circuit board adjacent such at least one thermally-conductive plate) is used to permanently join PCB 200 to surface 205 of thermal transfer plate 204.

PCB 200 is preferably composed of FR4 glass epoxy supporting copper circuit traces to which the leads of LEDs 104 are electrically coupled. In addition, both PCB 200 and bonding layer 202 comprise a plurality of aperture openings 206, each one located concurrently with a LED 104, as shown. Preferably, each aperture opening is of sufficient size to allow LED 104 to pass through PCB 200 and bonding layer 202 to a position of contact with heat absorptive surface 205 of thermal transfer plate 204, as shown (at least embodying herein wherein such at least one electrically-driven light emitting diode is mounted to such at least one circuit board such that such at least one portion of such at least one electrically-driven light emitting diode passes through such at least one aperture passage to comprise a position of thermal contact with such at least one thermally-conductive plate). Each LED 104 is thermally coupled to thermal heat absorptive surface 205, preferably using thermally conductive paste 208, as shown.

Thermal transfer plate 204 is preferably constructed from a material having good thermal conduction characteristics, preferably comprising a heat-transfer coefficient in the range of between about 75 and 235 W m$^{-1}$ K$^{-1}$ W/m K. In addition, the preferred material of thermal transfer plate 204 must be capable of sustaining a continuous operational temperature of at least 85 degrees Centigrade without degradation. Preferred materials include metallic compositions, most preferably an aluminum plate. Back face 196 of thermal transfer plate 204 is preferably held in thermal contact with first internal surface 180, as previously described. Thus, a preferred thermal pathway between each LED 104 and the heat-rejecting/heat-dissipating fins 116 of outer housing assembly 103 is provided (at least embodying herein at least one heat-dissipation assembly structured and arranged to dissipate heat generated by such at least one electrically-driven light emitting diode during production of the light; and at least embodying herein, wherein such at least one electrically-driven light emitting diode comprises at least one position of thermal contact with such at least one heat-absorption surface; and such at least one heat-dissipating surface comprises at least one position of thermal contact with such at least one extruded member). Upon reading the teachings of this specification, those of ordinary skill in the art will now understand that, under appropriate circumstances, considering such issues as cost, advances in technology, etc., other heat-rejection arrangements, such as the use of cooling fans, fluid cooling, bonding the PCB directly to the housing, etc., may suffice.

Referring again to the sectional views of FIG. 11 and FIG. 12, mounting assembly 108 preferably includes elongated support bar 126, attachment legs 110, and threaded fasteners 148. As noted previously, threaded fastener 148 is passed through slotted hole 146 of elongated support bar 126 to extend outwardly through continuous slot opening 135 and attachment leg 110 to engage support structure 119 of the underlying vehicle 101, as shown. Preferably, nut 152 is engaged on the distal portion of threaded fastener 148 extending through support structure 119, as shown. Tensioning of nut 152 against underlying support structure 119 preferably retains attachment leg 110, and the overall light bar assembly 102, to the underlying vehicle 101.

In a preferred assembly, the combination of threaded fastener 148 and nut 152 together function as a tensioner to tension attachment leg 110 to a position of contact with the underside of central housing section 105 and outer surface 140 of elongated support bar 126 to a position of frictional contact with inner surface 142 of the internal bar-receiving channel 130. The above-described structures and arrangements substantially comprise first positional retainer 132 (at least embodying herein at least one threaded tensioner structured and arranged to tension such at least one attacher to at least one position of contact with such at least one linear housing and such at least one outer surface of such at least one elongated support bar to the at least one position of contact with such at least one inner surface of such at least one internal bar-receiving channel).

Figure 22:
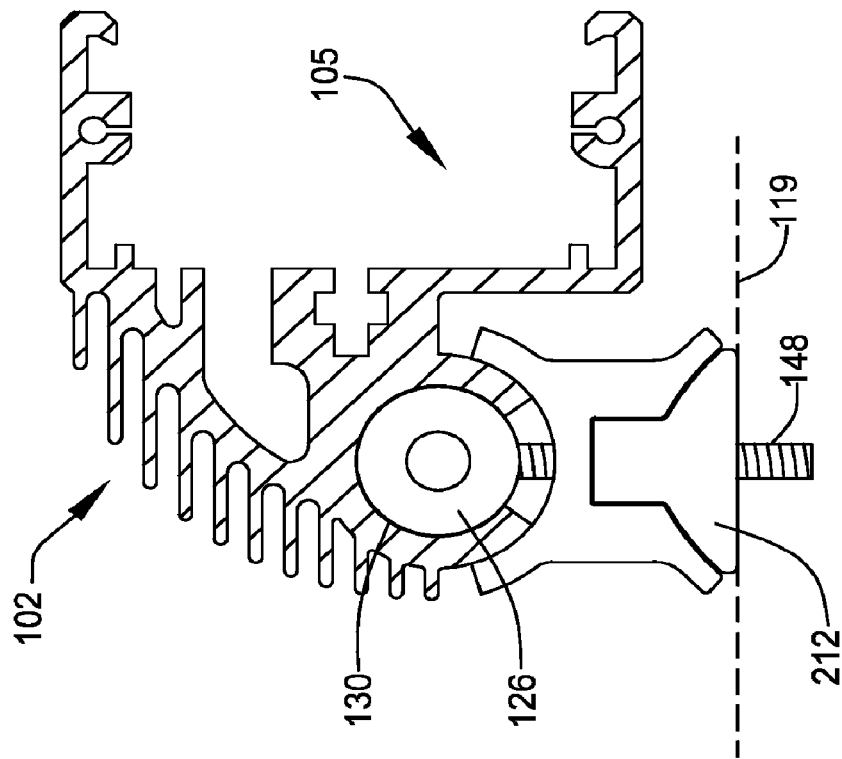
FIG. 22 shows a sectional view through a transverse section extending through the light bar assembly showing a preferred mounting to a substantially flat mounting surface according to the preferred embodiment of FIG. 1.

Each attachment leg 110 preferably comprises surface-conforming structures 210 to provide a means for generally conforming the attachment legs 110 to the underlying geometric profile of support structure 119. The geometric profile may be curved, as in the depicted cylindrical mounting bar, or may be generally planar. The principal preferred conformation of attachment leg 110 is designed to engage a curved surface, as shown. If attachment leg 110 is to be mounted to a planar (or other geometric profile) an accessory insert 212 comprising the appropriate interfacing shape is placed between attachment legs 110 and support structure 119, as illustrated in FIG. 22.

Figure 15:
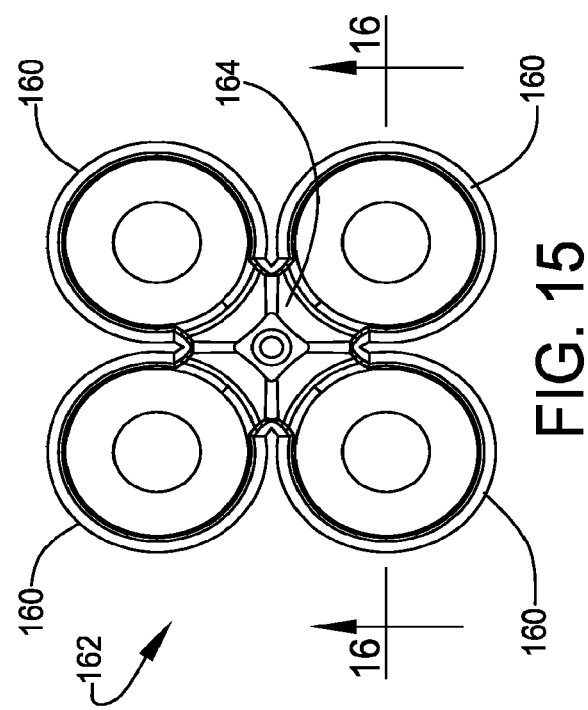
FIG. 15 shows a front view of the modular lens element of FIG. 14.
Figure 16:
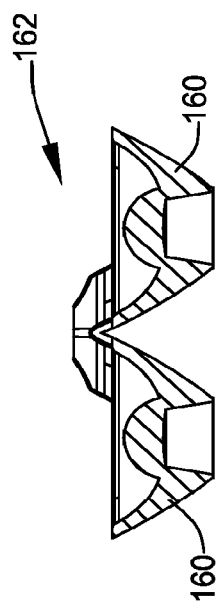
FIG. 16 shows a sectional view through the section 16-16 of FIG. 15.

FIG. 14 shows a perspective view of unitary lens module 162 of linear light module 106. FIG. 15 shows a front view of unitary lens module 162 of FIG. 14. FIG. 16 shows a sectional view through the section 16-16 of FIG. 15. Unitary lens module 162 preferably comprises groupings of four individual lens units 160 unified into a unitary lens module 162 by central supportive frame 164, as shown (at least embodying herein at least one unifying frame structured and arranged to unify at least four of such at least one focusing lens into a single modular lens element). In the preferred embodiment depicted in FIG. 9 and FIG. 10, 5 unitary lens modules 162 are arranged side-by-side in a generally linear organization, as shown. Preferably, each lens unit 160 of the unitary lens module 162 is designed to receive the light rays generated by LED 104 and, through a combination of refraction and total internal reflection, focus the light rays into a projected beam pattern. Preferred optical characteristics of lens units 160 are discussed in FIG. 17.

Figure 17:
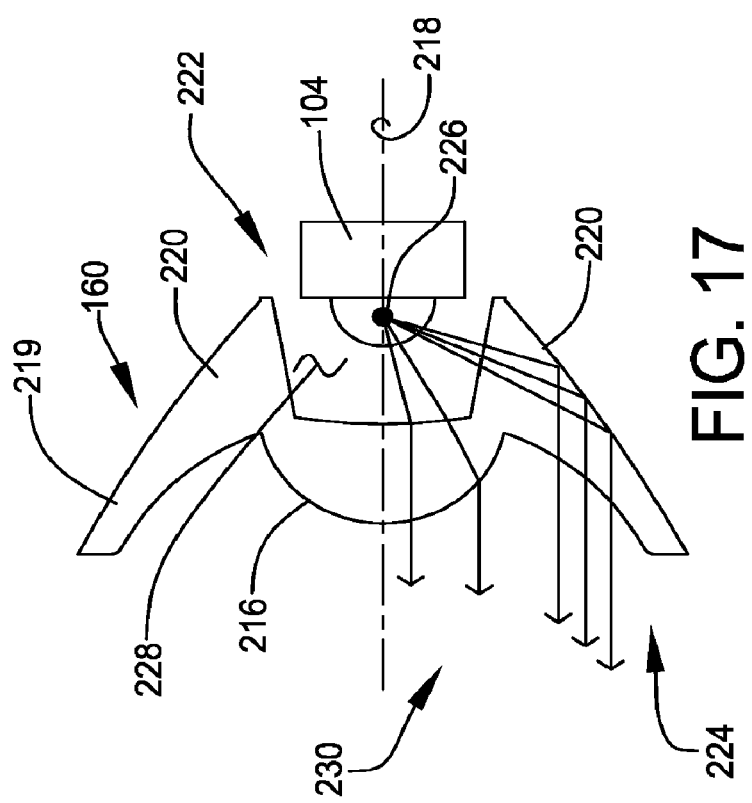
FIG. 17 shows a schematic sectional diagram through a single focusing lens of the modular lens element of FIG. 14.

FIG. 17 shows a schematic sectional diagram through a single focusing lens of the modular lens element of FIG. 14.

Referring now to FIG. 17, lens unit 160 preferably comprises two optical parts; a refractive member 216 located symmetrically around optical axis 218, and a total internal reflection (TIR) surface 220 located symmetrically around refractive member 216. Both refractive member 216 and TIR surface 220 are integrated within a rotationally symmetrical, solid transparent body 219, as shown. Preferably, lens unit 160 comprises an input end 222 adapted to receive light generated by LED 104 and an output end 224 from which a generally collimated beam pattern 230 is projected. TIR surface 220 generally approximates a frustoconical section, as shown. The preferred shape of the TIR surface 220 is chosen such that light originating from the LED 104 is emitted by the optical system in a direction substantially parallel to the optical axis 218. The outer TIR surface 220 may preferably comprise a true linear conic section, a spherical section, a hyperbolic curve, or most preferably, an ellipsoidal section.

In the depicted preferred embodiment of lens unit 160, refractive member 216 and TIR surface 220 comprise a substantially concomitant focal point 226, as shown. Focal point 226 is preferably located on optical axis 218 within an internal recess 228 of input end 222, as shown. Internal recess 228 is structured and arranged to enable the output of LED 104 to be located at focal point 226, as shown. TIR surface 220 is configured generally in accordance with the well-known principals of TIR optics. Total internal reflection (TIR) occurs when a light ray traveling in a transparent material encounters an interface with another transparent, but less optically dense material. Lens unit 160 is preferably fabricated from a clear material such as glass or more preferably an optically-clear plastic.

FIG. 17 also diagrammatically shows, by means of arrows, the preferred optical path of the light generated by LED 104. The light is preferably focused by lens unit 160 into the substantially parallel beam pattern 230, either by refraction at the central refractive member 216 or by reflection at TIR surface 220. TIR surface 220 is preferably oriented such that light originating from LED 104 and impinging on TIR surface 220 forms a parallel light beam extending substantially parallel to optical axis 218 (by reflection). The remaining light originating from LED 104 is collimated by the central refractive member 216 (by refraction). Thus, a significant and useful portion of the light originating from LED 104 is redirected entirely within lens unit 160. This avoids the need for additional external reflectors, for example, the application of a reflective coating to the surfaces of lens positioner 158.

Upon reading the teachings of this specification, those of ordinary skill in the art will now understand that, under appropriate circumstances, considering such issues as intended use, etc., other lens designs and focusing arrangements, such as lenses producing flood patterns, lenses producing spot patterns, lenses using Fresnel features, lenses omitting the refractive element, etc., may suffice.

Figure 18:
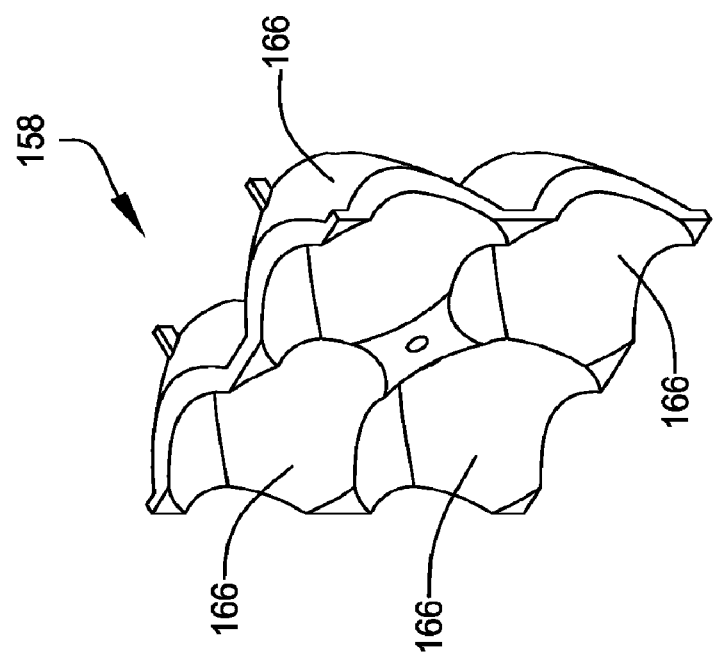
FIG. 18 shows a perspective view of a lens positioner structured and arranged to position the modular lens element of FIG. 18 in an operable position within the light bar assembly of FIG. 1.
Figure 20:
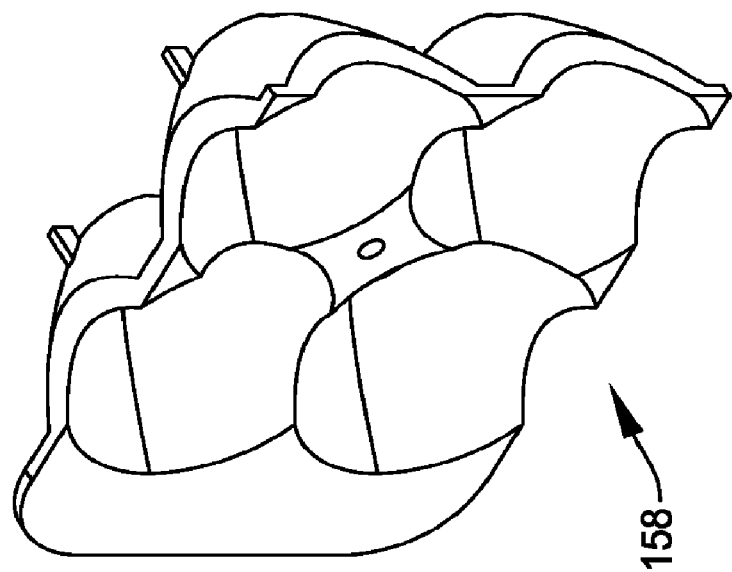
FIG. 20 shows a perspective view of an end lens positioner structured and arranged to position a modular lens element in an operable position within adjacent an end cap of the light bar assembly.
Figure 19:
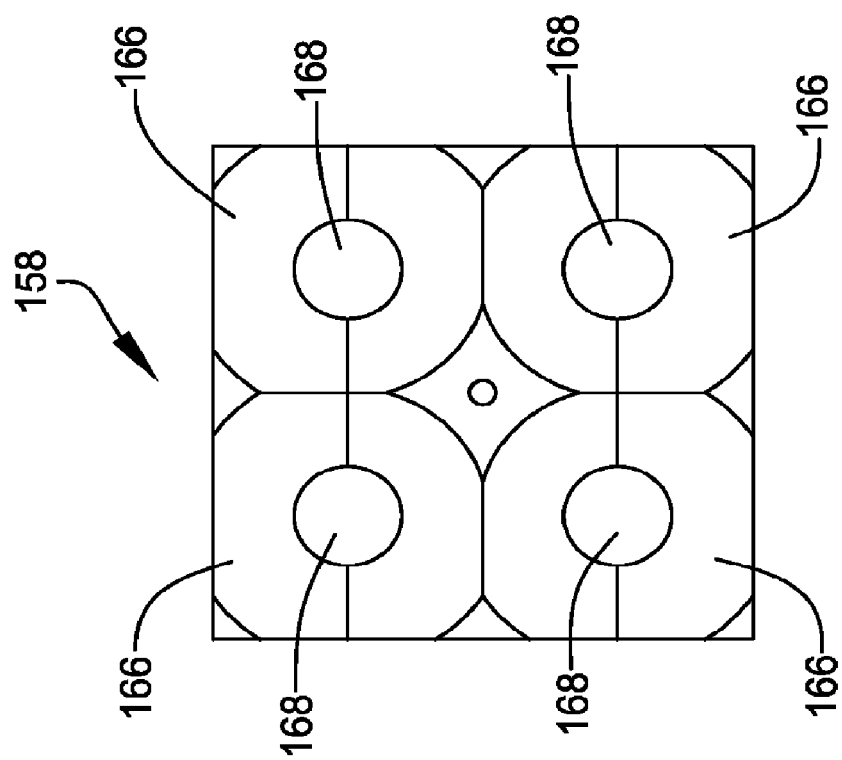
FIG. 19 shows a front view of a preferred modular grouping of lens positioners and modular lens elements according to the preferred embodiment of FIG. 1.

FIG. 18 shows a perspective view of lens positioner 158 structured and arranged to position unitary lens module 162 of FIG. 18 in an operable position over LEDs 104. FIG. 19 shows a front view of a preferred modular grouping of lens positioners 158 and unitary lens module 162 according to the preferred embodiment of FIG. 1. FIG. 20 shows a perspective view of an end lens positioner 158.

Preferably, each receiver 166 of lens positioners 158 preferably comprises a generally frustoconical inner profile substantially matching the outer profile of TIR surface 220. Aperture 168 of receiver 166 (see FIG. 19) allows LED 104 to pass through receiver 166 to internal recess 228 of lens unit 160.

FIG. 21 shows a sectional view, through a transverse section extending through the extruded central housing section 105 of light bar assembly 102, according to the preferred embodiment of FIG. 1. Visible in FIG. 21 is heat-dissipating fins 116, bar-receiving channel 130, continuous slot opening 135, continuous internal hollow cavity 136, inner surface 142, cover receiving slot 174, first channel 178, first internal surface 180, second channel 182, and T-shaped-cross-section slot 184.

FIG. 22 shows a sectional view, through a transverse section extending through light bar assembly 102 showing a preferred mounting to a substantially flat support structure 119 of the underlying vehicle 101, according to the preferred embodiment of FIG. 1. The principal preferred conformation of attachment leg 110 is designed to engage a curved surface, as shown in FIG. 11 and FIG. 12. If attachment leg 110 is to be mounted to a planar (or other geometric profile) an accessory insert 212 comprising the appropriate interfacing shape is placed between attachment legs 110 and support structure 119, as shown. Accessory insert 212 preferably comprises a substantially resilient material, preferably rubber, alternately preferably a synthetic rubber such as neoprene.

Figure 23A:
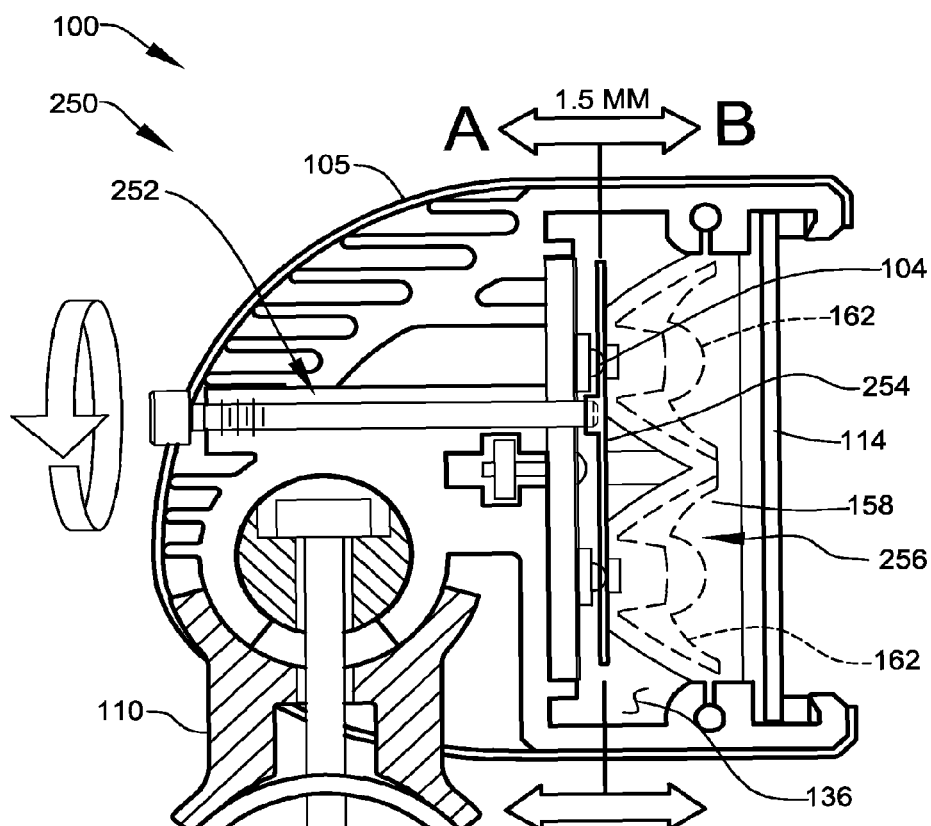
FIG. 23A shows a sectional view through a transverse section extending through the light bar assembly showing a preferred beam-pattern adjuster according to an alternate embodiment of the present invention.
Figure 23B:
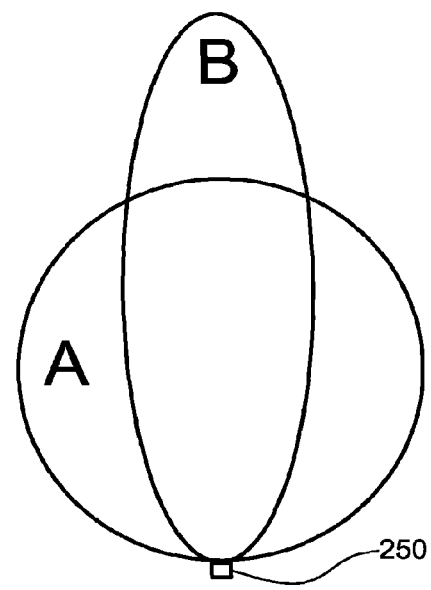
FIG. 23B shows a schematic diagram illustrating beam pattern adjustments responsive to user manipulation of the beam-pattern adjuster of FIG. 23A.

FIG. 23A shows a sectional view through a transverse section extending through an alternate light bar assembly 250 of auxiliary lighting system 100 showing a preferred beam-pattern adjuster 252 according to an alternate embodiment of the present invention. Alternate light bar assembly 250 preferably comprises beam-pattern adjuster 252 whereby a user may selectively adjust the emitted beam pattern from linear light module 256 between at least one flood pattern A and least one focused (spot) beam pattern B, as illustrated in FIG. 23B. Preferably, the beam pattern produced by the unit is selectable by adjusting the distance of the unitary lens modules 162 relative to the LEDs 104. More specifically, beam-pattern adjuster 252 preferably modulates the position of each LED 104 relative to the focal point 226 of its associated lens unit 160.

Preferably, beam-pattern adjuster 252 comprises a linear back plate 254, as shown, to which lens positioners 158 and unitary lens module 162 are mounted, as shown. Preferably, back plate 254 is movably mounted within continuous internal hollow cavity 136 and is separate from thermal transfer plate 204, as shown. One or more positional adjusters 256 are coupled to back plate 254 and extend to a position of user access, as shown. Preferably, user manipulation of positional adjuster 256 results in forward or backward translational movement of back plate 254, lens positioners 158, and unitary lens module 162 relative to LEDs 104. Applicant has determined that, using the depicted arrangement, movement of about 1and ½ mm is sufficient to change the beam pattern between flood beam pattern A and spot beam pattern B. Upon reading the teachings of this specification, those of ordinary skill in the art will now understand that, under appropriate circumstances, considering such issues as intended use, cost, component selection, etc., other arrangements, such as utilizing motorized adjusters, independently adjusting several but not all lenses, etc., may suffice.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A lighting system comprising:
   a) at least one light module structured and arranged to produce light;
   b) at least one housing, comprising at least one housing length, structured and arranged to house said at least one light module;
   c) at least one mounting assembly structured and arranged to assist mounting of said at least one housing to at least one mountable surface;
   d) wherein said at least one mounting assembly comprises
      i) at least one support bar structured and arranged to support said at least one housing along a portion of said at least one housing length,
      ii) wherein said at least one support bar comprises at least one longitudinal axis and at least one bar length,
      iii) moveably coupled with said at least one support bar, at least one attacher structured and arranged to assist fixed attachment of said at least one support bar to the at least one mountable surface,
      iv) wherein said at least one attacher comprises at least one axial translator structured and arranged to assist axial translation of said at least one attacher along at least one translational axis oriented substantially parallel to said at least one longitudinal axis of said at least one support bar;
   e) wherein said at least one housing comprises at least one internal bar-receiving channel structured and arranged to receive therein said at least one support bar; and
   f) wherein said at least one housing is structured and arranged to be rotatable about said at least one longitudinal axis when engaged within said at least one internal bar-receiving channel.

2. The lighting system according to claim 1 wherein said at least one housing comprises:
   a) at least one extruded member having open ends and at least one internal hollow cavity structured and arranged to house said at least one light module;
   b) at least one end cap structured and arranged to cap said open ends;
   c) at least one front protective cover structured and arranged to protectively cover at least one front portion of said at least one internal hollow cavity;
   d) wherein said at least one front protective cover comprises at least one substantially transparent composition structured and arranged transparently pass the light produced by said at least one light module therethrough.

3. The lighting system according to claim 1 further comprising at least one environmental infiltrate blocker structured and arranged to block the passage of environmental infiltrates into said at least one internal hollow cavity through mated engagements of said at least one extruded member.

4. The lighting system according to claim 2 further comprising:
   a) situate between each said at least one end cap and each said at least one open end, at least one end seal structured and arranged to seal said at least one end cap to a respective said at least one open end; and
   b) situate between said at least one front protective cover, said at least one end cap, and said at least one extruded member, at least one front seal structured and arranged to seal said at least one front protective cover to said at least one end cap and said at least one extruded member;
   c) wherein said at least one end seal and said at least one front seal assist in blocking the intrusion of environmental infiltrates to within said at least one internal hollow cavity.

5. The lighting system according to claim 4 wherein said at least one light module comprises:
   a) at least one electrically-driven light emitting diode structured and arranged to generate light;
   b) at least one focusing lens structured and arranged to focus the generated light into at least one beam pattern; and
   c) at least one lens positioner structured and arranged to position said at least one focusing lens relative to said at least one light source;
   d) wherein said at least one focusing lens produces such at least one beam pattern by total internal reflection.

6. The lighting system according to claim 5 wherein said at least one focusing lens produces such at least one beam pattern by total internal reflection and refraction.

7. The lighting system according to claim 5 further comprising at least one unifying frame structured and arranged to unify at least four of said at least one focusing lens into a single modular lens element.

8. The lighting system according to claim 5 wherein said at least one light module further comprises:
   a) at least one heat-dissipation assembly structured and arranged to dissipate heat generated by said at least one electrically-driven light emitting diode during production of the light;
   b) wherein said at least one heat-dissipation assembly comprises
      i) at least one circuit board structured and arranged to provide circuit-board support of said at least one electrically-driven light emitting diode,
      ii) at least one thermally-conductive plate structured and arranged to absorb and dissipate the heat, and
      iii) at least one positioner structured and arranged to position said at least one circuit board adjacent said at least one thermally-conductive plate;
   c) wherein said at least one circuit board comprises at least one aperture structured and arranged to pass at least one portion of said at least one electrically-driven light emitting diode therethrough;
   d) wherein said at least one electrically-driven light emitting diode is mounted to said at least one circuit board such that such at least one portion of said at least one electrically-driven light emitting diode passes through said at least one aperture passage to comprise a position of thermal contact with said at least one thermally-conductive plate.

9. The lighting system according to claim 8 wherein:
a) said at least one thermally-conductive plate comprises at least one heat-absorption surface and at least one heat-dissipating surface;
b) said at least one electrically-driven light emitting diode comprises at least one position of thermal contact with said at least one heat-absorption surface; and
c) said at least one heat-dissipating surface comprises at least one position of thermal contact with said at least one extruded member;
d) whereby the heat generated by said at least one electrically-driven light emitting diode during production of the light is dissipated by a transfer of heat energy to said at least one extruded member.

10. The lighting system according to claim 9 wherein said at least one extruded member comprises:
a) at least one external heat-rejection region structured and arranged to assist rejection of the heat from said at least one extruded member to a surrounding environment;
b) wherein said at least one external heat-rejection region comprises a plurality of fins structured and arranged to provide increased surface area in thermal communication with the surrounding environment.

11. The lighting system according to claim 5 wherein said at least one mounting assembly further comprises:
a) at least one first positional retainer structured and arranged to positionally retain said at least one housing in at least one fixed rotational position relative to said at least one support bar;
b) wherein said at least one first positional retainer comprises at least one adjustable biaser structured and arranged to adjustably bias at least one outer surface of said at least one support bar toward at least one position of contact with at least one inner surface of said at least one internal bar-receiving channel;
c) wherein said at least one first positional retainer assists in maintaining such at least one fixed rotational position substantially by at least one frictional interaction between such at least one outer surface of said at least one support bar and such at least one inner surface of said at least one internal bar-receiving channel.

12. The lighting system according to claim 11 wherein said at least one adjustable biaser comprises:
a) at least one threaded tensioner structured and arranged to tension said at least one attacher to at least one position of contact with said at least one housing and such at least one outer surface of said at least one support bar to the at least one position of contact with such at least one inner surface of said at least one internal bar-receiving channel;
b) wherein said at least one support bar comprises at least one slot structured and arranged to allow translational movement of said at least one threaded tensioner substantially parallel with said at least one longitudinal axis; and
c) wherein said at least one threaded tensioner is structured and arranged to pass through said at least one slot during such coupling of said at least one attacher with said at least one support bar.

13. The lighting system according to claim 12 wherein said at least one mounting assembly further comprises:
a) at least one second positional retainer structured and arranged to retain said at least one housing in at least one fixed rotational position relative to said at least one support bar;
b) wherein said at least one second positional retainer comprises at least one threaded end lock structured and arranged to positionally lock said at least one end cap in at least one fixed rotational position relative to said at least one support bar.

14. The lighting system according to claim 13 wherein said at least one end lock comprises at least one threaded coupler structured and arranged to frictionally couple said at least one end cap to said at least one support bar.

15. The lighting system according to claim 14 further comprising at least one conformer structured and arranged to conform said at least one attacher to at least one geometric profile of the at least one mountable surface.

16. The lighting system according to claim 15 wherein said at least one conformer is structured and arranged to be attachable to at least one generally radiused profile of the at least one mountable surface.

17. The lighting system according to claim 15 wherein said at least one conformer is structured and arranged to be attachable to a generally planar of the at least one mountable surface.

18. The lighting system according to claim 15 wherein said at least one conformer comprises at least one dampener structured and arranged to dampen transmission of mechanical forces through said at least one attacher.

19. The lighting system according to claim 15 wherein each said at least one attacher is independently adjustable along the at least one longitudinal axis of said at least one support bar.

20. A lighting system comprising:
a) a light module structured and arranged to produce light;
b) a housing, comprising at least one housing length, said housing having a first end and a second end and at least one internal cavity structured and arranged to house said at least one light module;
c) a pair of end caps structured and arranged to cap said first and second ends;
d) a mounting assembly structured and arranged to assist mounting of said housing to at least one mountable surface, wherein said mounting assembly comprises at least one support member structured and arranged to support a portion of said housing,
f) said housing comprises at least one internal support member-receiving channel having a longitudinal axis and structured and arranged to receive therein said at least one support member; and
g) wherein said housing is structured and arranged to be rotatable about said longitudinal axis when said at least one support member is engaged within said at least one internal support member-receiving channel.

21. The lighting system according to claim 20 further comprising at least one environmental infiltrate blocker structured and arranged to block the passage of environmental infiltrates into said at least one internal cavity.

22. The lighting system according to claim 20 further comprising:
a) situated between each said at end caps and each said first and second ends, at least one end seal structured and arranged to seal said end caps to a respective said first and second ends, wherein said at least one end seal assist in blocking the intrusion of environmental infiltrates to within said at least one internal cavity.

23. The lighting system according to claim 20 wherein said at least one light module comprises:
a) at least one electrically-driven light emitting diode structured and arranged to generate light;
b) at least one focusing lens structured and arranged to focus the generated light into at least one beam pattern; and c) at least one lens positioner structured and arranged to position said at least one focusing lens relative to said at least one light source.

24. The lighting system according to claim 23 wherein said at least one focusing lens produces such at least one beam pattern by total internal reflection and refraction.

25. The lighting system according to claim 23 further comprising at least one unifying frame structured and arranged to unify at least four of said at least one focusing lens into a single modular lens element.

26. The lighting system according to claim 20 wherein said at least one light module further comprises:
a) at least one heat-dissipation assembly structured and arranged to dissipate heat generated by said at least one electrically-driven light emitting diode during production of the light;
b) wherein said at least one heat-dissipation assembly comprises
  i) at least one circuit board structured and arranged to provide circuit-board support of said at least one electrically-driven light emitting diode,
  ii) at least one thermally-conductive plate structured and arranged to absorb and dissipate the heat, and
  iii) at least one positioner structured and arranged to position said at least one circuit board adjacent said at least one thermally-conductive plate;
c) wherein said at least one circuit board comprises at least one aperture structured and arranged to pass at least one portion of said at least one electrically-driven light emitting diode therethrough;
d) wherein said at least one electrically-driven light emitting diode is mounted to said at least one circuit board such that such at least one portion of said at least one electrically-driven light emitting diode passes through said at least one aperture passage to comprise a position of thermal contact with said at least one thermally-conductive plate.

27. The lighting system according to claim 26 wherein:
a) said at least one thermally-conductive plate comprises at least one heat-absorption surface and at least one heat-dissipating surface;
b) said at least one electrically-driven light emitting diode comprises at least one position of thermal contact with said at least one heat-absorption surface; and
c) said at least one heat-dissipating surface comprises at least one position of thermal contact with said at least one extruded member;
d) whereby the heat generated by said at least one electrically-driven light emitting diode during production of the light is dissipated by a transfer of heat energy to said housing.

28. The lighting system according to claim 27 wherein said housing comprises at least one external heat-dissipating region structured and arranged to assist dissipation of the heat from said housing to a surrounding environment.

29. The lighting system according to claim 28, wherein said at least one external heat-dissipating region comprises a plurality of fins structured and arranged to provide increased surface area in thermal communication with the surrounding environment.

* * * * *